United States Patent
Shirai et al.

(10) Patent No.: US 6,701,413 B2
(45) Date of Patent: Mar. 2, 2004

(54) DISK DRIVE PERFORMING A READ-AHEAD OPERATION OF THE DATA FROM THE DISK

(75) Inventors: Katsumi Shirai, Yokohama (JP); Ichiro Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/951,120

(22) Filed: Sep. 13, 2001

(65) Prior Publication Data

US 2002/0038406 A1 Mar. 28, 2002

Related U.S. Application Data

(63) Continuation of application No. PCT/JP99/02339, filed on Apr. 30, 1999.

(51) Int. Cl.$^7$ .................................................. G06F 11/00
(52) U.S. Cl. ........................... 711/137; 711/4; 710/260; 714/48; 714/52; 714/764
(58) Field of Search ...................... 711/137, 4; 710/52, 710/260; 714/2, 15, 48, 52, 764

(56) References Cited

U.S. PATENT DOCUMENTS

| | | | |
|---|---|---|---|
| 5,732,237 A | 3/1998 | Ikeda | 711/112 |
| 5,835,015 A | 11/1998 | Ikeda | 340/568.1 |
| 5,864,528 A | 1/1999 | Ikeda | 369/53.21 |
| 5,875,455 A * | 2/1999 | Ito | 711/113 |
| 5,983,319 A * | 11/1999 | Ito | 711/113 |
| 6,058,241 A * | 5/2000 | Kawamura et al. | 386/68 |
| 6,249,804 B1 * | 6/2001 | Lam | 709/203 |
| 2001/0006495 A1 * | 7/2001 | Hayashi et al. | 369/47.3 |
| 2001/0014961 A1 * | 8/2001 | Kaneda | 714/764 |
| 2001/0046191 A1 * | 11/2001 | Imada et al. | 369/47.14 |

FOREIGN PATENT DOCUMENTS

| | | |
|---|---|---|
| JP | 2-76048 | 3/1990 |
| JP | 4-291616 | 10/1992 |
| JP | 5-114245 | 5/1993 |
| JP | 5-274089 | 10/1993 |
| JP | 5-298230 | 11/1993 |
| JP | 7-093886 | 4/1995 |
| JP | 7-111069 | 4/1995 |
| JP | 7-210454 | 8/1995 |
| JP | 7-320387 | 8/1995 |
| JP | 8-95785 | 4/1996 |
| JP | 8-328751 | 12/1996 |
| JP | 8-329469 | 12/1996 |
| JP | 10-149542 | 6/1998 |
| JP | 11-007706 | 1/1999 |

* cited by examiner

*Primary Examiner*—Mano Padmanabhan
*Assistant Examiner*—Jasmine Song
(74) *Attorney, Agent, or Firm*—Greer, Burns & Crain, Ltd.

(57) ABSTRACT

In a disk drive, a read-ahead operation is prevented from being aborted due to an interrupt such as an error, to prevent the operation of a host device from stopping and to enhance reliability. The disk drive is connected to a host computer, the host device, via an interface, and performs read ahead after reading data in accordance with a data read command received from the host computer. When a read-ahead abort prevention function is provided at the host computer side, if the read ahead is interrupted by detecting an error at the disk drive side during the read ahead, the host device, after receiving an error report, causes the disk drive to resume the read ahead from the address at which the read ahead was interrupted. On the other hand, when the read-ahead abort prevention function is provided at the disk drive side, the disk drive, upon detecting an error, retries the read ahead from the address at which the error occurred. The read-ahead operation can thus be prevented from being aborted when an error is encountered.

8 Claims, 14 Drawing Sheets

DISK DRIVE PERFORMING A READ-AHEAD OPERATION OF THE DATA FROM THE DISK

CROSS-REFERENCE TO RELATED APPLICATIONS

This application is a continuation of PCT/JP99/02339 file date Apr. 30, 1999.

TECHNICAL FIELD

The present invention relates to a disk drive and, more particularly, to a disk drive, such as an optical disk drive, that uses a read-ahead scheme whereby when reading the requested segment of data, the subsequent segments of data are also read out and stored in advance in a data buffer.

BACKGROUND ART

Conventionally, a disk drive that uses an optical disk such as a CD-R (compact disk-recordable) or MO (Magneto-Optical disk) is used in many cases by connecting it to a host computer, i.e., a host device, via a specified interface such as a SCSI interface. In such use conditions, the transfer speed of data from the disk drive to the host computer is faster than the data read speed of the disk drive. Further, when the host computer reads data from an optical disk, it is often the case that data are read sequentially from consecutive addresses on the optical disk.

For this reason, in an optical disk reading device such as a CD-ROM drive or an MO drive, when a read command for data at a particular address on the optical disk is input from the host computer into the disk drive, the disk drive usually performs so-called read ahead, that is, at the same time that the data at the specified address is read out and stored in a data buffer, data at the subsequent addresses are also read out from the optical disk and stored in the data buffer.

If data at the subsequent addresses have been read ahead and stored in the data buffer following the data read from the specified address on the optical disk, as described above, then, when the address specified by the next read instruction from the host computer is one that immediately follows the previously specified read address, data stored in the data buffer can be transferred to the host computer without having to read it from the optical disk; this enhances read performance for accesses made from the host computer.

Such a data read-ahead scheme for a disk drive is disclosed, for example, in Japanese Unexamined Patent Publication No. 7-73654.

However, the prior art read-ahead scheme has had the problem that when an interrupt, due to an error or the like, occurs during a read-ahead operation in the disk drive, the operation of the host computer stops because the read-ahead operation is aborted with no retries made to execute the read ahead from the address at which the interrupt occurred.

DISCLOSURE OF THE INVENTION

Accordingly, it is a first object of the present invention to provide a disk drive that can prevent degradation of overall system performance by using the readout control function of the host device and making provisions at the host device side to prevent the read-ahead operation from being aborted when an interrupt, due to an error or the like, occurs during the read-ahead of data from a disk.

It is a second object of the present invention to provide a disk drive that has an improved read-ahead operation control function with provisions made at the disk drive side to prevent the read-ahead operation from being aborted when an interrupt, due to an error or the like, occurs during the read-ahead of data from a disk.

According to a first aspect of the present invention which attains the above objects, there is provided a disk drive comprising a reproducing part connected to a host device via an interface for reproducing data recorded on a disk, a buffer memory for storing the reproduced data, and a control part for causing the reproducing part to reproduce data in accordance with an address contained in a data read signal supplied from the host device, and for transferring the reproduced data to the host device after temporarily storing the reproduced data in the buffer memory, the disk drive characterized by the provision of: a read-ahead processing part for performing a read-ahead operation by sequentially reading ahead data from addresses starting at the address that immediately follows the address contained in the data read signal supplied from the host device; an error occurrence detecting part for detecting the occurrence of an error during the read-ahead operation; an error occurrence reporting part for suspending, when the occurrence of an error is detected, the read-ahead operation at the address at which the error occurred, and for reporting the occurrence of the error to the host device; and a read-ahead operation resume instructing part for instructing, upon receiving a prescribed command from the host device after reporting the occurrence of the error to the host device, the read-ahead processing part to resume the read-ahead operation from the address at which the read-ahead operation was suspended.

According to a second aspect of the present invention, in the disk drive of the first aspect, when the error occurrence detecting part detects the occurrence of a read-ahead error at the same address for a second time, the read-ahead operation resume instructing part instructs the read-ahead processing part to resume the read-ahead operation from the address that immediately follows the error-detected address, without causing the error occurrence reporting part to suspend the read-ahead operation, and at the same time, changes the contents of the buffer memory where read-ahead data is mapped.

According to the first and second aspects, even when an interrupt due to an error or the like occurs during the read-ahead of data from the disk, the overall performance of the system does not drop, because provisions are made at the host device side to prevent the read-ahead operation from being aborted, by utilizing the readout control function of the host device.

According to a third aspect of the present invention, there is provided a disk drive comprising a reproducing part connected to a host device via an interface for reproducing data recorded on a disk, a buffer memory for storing the reproduced data, and a control part for causing the reproducing part to reproduce data in accordance with an address contained in a data read signal supplied from the host device, and for transferring the reproduced data to the host device after temporarily storing the reproduced data in the buffer memory, the disk drive characterized by the provision of: a read-ahead processing part for performing a read-ahead operation by sequentially reading ahead data from addresses starting at the address that immediately follows the address contained in the data read signal supplied from the host device; an error occurrence detecting part for detecting the occurrence of an error during the read-ahead operation; and a retry part for performing a retry when the occurrence of an error is detected, by retrying the read-ahead operation from the address at which the error occurred.

According to a fourth aspect of the present invention, in the disk drive of the third aspect, the retry part performs the retry successively a predetermined number of times or for a predetermined time.

According to a fifth aspect of the present invention, in the disk drive of the fourth aspect, if the error persists even after the retry has been performed successively the predetermined number of times or for the predetermined time, the retry part stops performing the retry and waits for an instruction from the host device.

According to a sixth aspect of the present invention, in the disk drive of the fourth aspect, if the retry has been performed successively more than the predetermined number of times or for more than the predetermined time, the retry part resumes the read-ahead operation from the address that immediately follows the address at which the error occurred, and at the same time, changes the contents of the buffer memory where read ahead data is mapped.

According to the third to sixth aspects, even when an interrupt due to an error or the like occurs during the read-ahead of data from the disk, the read-ahead operation can be prevented from being aborted at the disk drive side by using the read-ahead operation control function of the disk drive.

According to a seventh aspect of the present invention, the disk drive of any one of the first to sixth aspects further includes a writing part for writing data to the disk wherein, when a data write command is issued from the host device during the read-ahead operation of the read-ahead processing part, the read-ahead processing part suspends the read-ahead operation and, after data writing by the writing part is completed, resumes the read-ahead operation from the address at which the read-ahead operation was suspended.

According to an eighth aspect of the present invention, in the disk drive of any one of the first to sixth aspects, when a data read command for a specific predetermined address is issued from the host device during the read-ahead operation of the read-ahead processing part, the read-ahead processing part temporarily suspends the read-ahead operation, but does not perform read ahead for the specific address but resumes the read-ahead operation from the address at which the read-ahead operation was suspended.

According to a ninth aspect of the present invention, in the disk drive of any one of the first to sixth aspects, when a designated reset command is issued from the host device during the read-ahead operation of the read-ahead processing part, the read-ahead processing part suspends the read-ahead operation and, after resetting by the reset command is completed, resumes the read-ahead operation from the address at which the read-ahead operation was suspended.

According to the seventh to ninth aspects, even when a write command, a read command for a specific address, or a reset command arrives during the read-ahead operation, the read-ahead operation is not aborted because the read-ahead operation is resumed when the processing specified by the command is completed.

According to a 10th aspect of the present invention, in the disk drive of any one of the first to sixth aspects, when a specific predetermined address is reached during the read-ahead operation of the read-ahead processing part, the read-ahead processing part temporarily suspends the read-ahead operation, skips the specific address, and resumes the read-ahead operation from the address that immediately follows the specific address, while at the same time, changing the contents of the buffer memory where read ahead data is mapped.

According to the 10th aspect, when a specific predetermined address not needing read ahead is reached during the read-ahead operation, the read-ahead operation skips the address not needing read ahead and proceeds to read ahead data at the next address, and the read ahead data is mapped in a different table; in this way, needless read ahead can be eliminated.

According to an 11th aspect of the present invention, the disk drive of any one of the first to sixth aspects further comprises a nonvolatile internal memory, and is characterized by the provision of: an ID confirming part for confirming an ID number recorded on the disk each time the disk is loaded into the disk drive; a first read address storing part for storing a first read address in the nonvolatile memory in association with the ID number, the first read address being one received from the host device for the first time after the disk is loaded into the disk drive; and a preceding read-ahead processing part for searching the first read address storing part for the ID number of the disk and its associated first read address when the disk is loaded into the disk drive and, when the ID number and the associated first read address are found, causing the read-ahead processing part to perform a read-ahead operation starting from the first read address.

According to a 12th aspect of the present invention, the disk drive of any one of the first to sixth aspects further comprises a nonvolatile internal memory, and is characterized by the provision of: an ID confirming part for confirming an ID number recorded on the disk each time the disk is loaded into the disk drive; a first read address storing part for storing a first read address in the nonvolatile memory in association with the ID number, the first read address being one received from the host device for the first time after the disk is loaded into the disk drive; a first read address storing frequency calculating part for calculating for each ID number a frequency representing the number of times that the first read address is stored by the first read address storing part; and a preceding read-ahead processing part for searching the first read address storing part for the ID number of the disk and its associated first read address when the disk is loaded into the disk drive and, when the ID number and the associated first read address are found, causing the read-ahead processing part to perform a read-ahead operation starting from the first read address whose frequency calculated by the first read address storing frequency calculating part is the highest.

According to the 11th and 12th aspects, when the disk is loaded into the disk drive, the disk ID is checked, and the read-ahead operation is performed based on the frequency of the first address specified when the same disk was loaded previously, or on the same address as the previously specified first address; accordingly, when the read command for the same address arrives first, processing time can be reduced.

BRIEF DESCRIPTION OF THE DRAWINGS

The above and other objects, features, and advantages of the invention will be described in detail below with reference to preferred embodiments, taken in conjunction with the accompanying drawings in which.

BEST MODE FOR CARRYING OUT THE INVENTION

Figure 1:
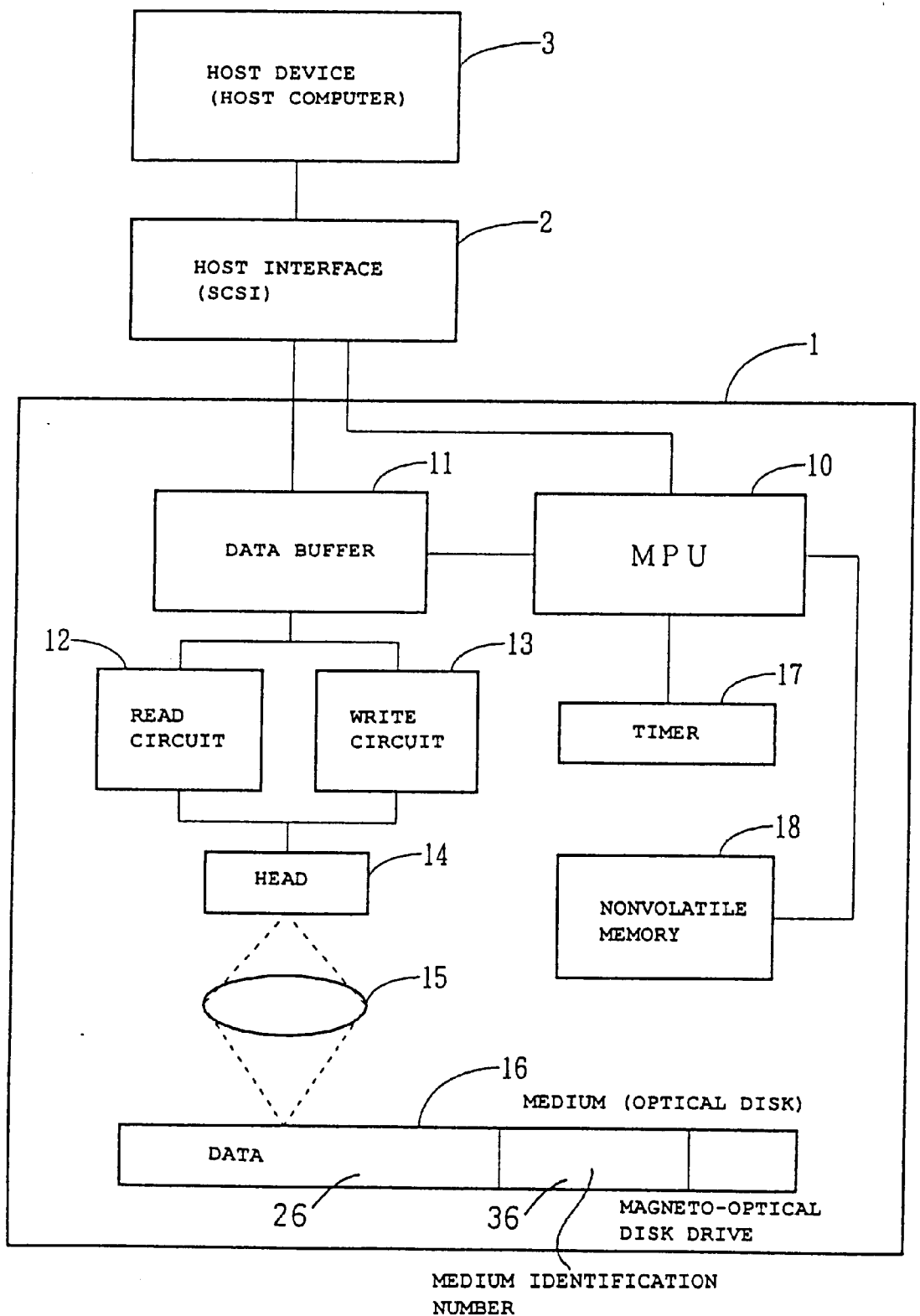
FIG. 1 is a diagram showing a system in which a disk drive according to the present invention is connected to a host device.

FIG. 1 shows the configuration of a magneto-optical disk drive (hereinafter simply referred to as the optical disk drive), according to the present invention, along with the configuration of a system in which the optical disk drive 1 is connected to a host device 3 such as a host computer via a host interface 2 (the host device 3 is hereinafter referred to as the host computer). The host computer 3 issues data read or data write instructions to the optical disk drive 1, a subordinate device. The host interface 2 uses, for example, SCSI (Small Computer System Interface) and provides an information transfer link between the host computer 3 as the host device and the optical disk drive 1 as the subordinate device.

The optical disk drive 1 uses a magneto-optical disk 16 (hereinafter simply referred to as the optical disk) as a medium. The driving mechanism for the optical disk 16 is not shown here. The optical disk 16 contains at least a data recording area 26 and a medium identification number recording area 36. A beam from a head 14 is focused through an objective lens 15 onto the optical disk 16 to write data contained in the beam onto the optical disk 16 or to read data on the optical disk 16 by the beam reflected from it. A read circuit 12, which is connected to the head 14, amplifies the data read from the optical disk 16. Also connected to the head 14 is a write circuit 13 which amplifies a signal so that data can be written to the optical disk 16. A data buffer 11 is connected to both the read circuit 12 and the write circuit 13. The data buffer 11 is used to temporarily store the data read from the optical disk 16 or the data to be written to the optical disk 16. The data buffer 11 is connected to the host interface 2 external to the optical disk drive 1. The contents stored in the data buffer 11 are lost when the optical disk 16 is removed from the optical disk drive 1.

The optical disk drive 1 also contains an MPU (Microprocessor Unit) 10. The MPU 10 performs such functions as controlling the data buffer 11 and communicating with the host computer 3 via the host interface 2. The MPU 10 contains an optical disk controller (ODC) and an optical disk drive controller (ODD). The ODC is responsible for control operations on the upstream side of the ODD that controls the optical disk drive unit. Accordingly, when a read-ahead operation is interrupted due to an error, the MPU can perform error notification control or a retry operation for error recovery. A timer 17 is connected to the MPU 10. The timer 17 measures elapsed time and, when a time preset by the MPU 10 has elapsed, generates a signal to cause the MPU 10 to service an interrupt.

In this embodiment, the optical disk drive 1 has been described as being equipped with the MPU 10 as a control unit that controls the optical disk, but the optical disk drive contemplated by the present invention need not necessarily be equipped with such an MPU, but need only be provided with a control unit having control functions equivalent to the functions of the above-described ODC and ODD. Accordingly, the configuration of the optical disk drive contemplated by the present invention is not limited to that shown in FIG. 1, but various modifications can be made.

Further, in this embodiment, a nonvolatile memory 18 is connected to the MPU 10. The nonvolatile memory 18 has an area for storing the medium identification number of the optical disk 16 and an address storing area for storing frequently referenced read addresses in association with the medium identification number. When the optical disk 16 is inserted in the optical disk drive 1, the MPU 10 reads out the medium identification number of the optical disk 16 before a command is entered from the host computer 3, and searches the nonvolatile memory 18 to see whether the same medium identification number is stored in the medium identification number storing area. If the medium identification number of the optical disk 16 inserted in the optical disk drive 1 matches one stored in the medium identification number storing area of the nonvolatile memory 18, the read addresses frequently used to read the optical disk 16 are read out of the address storing area corresponding to the medium identification number; by so doing, data at the frequently used addresses can be read out and stored in advance in the data buffer 11.

Figure 2:
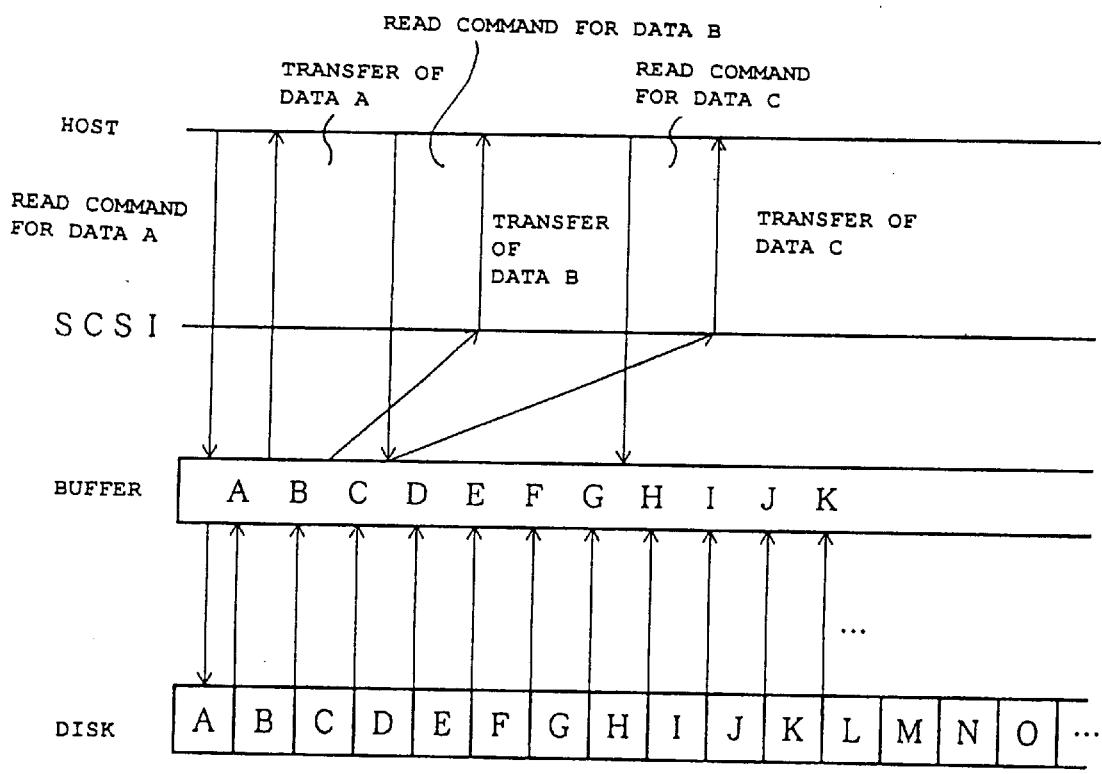
FIG. 2 is a time chart for explaining a read-ahead operation in the disk drive when the read-ahead operation proceeds without encountering any errors.

FIG. 2 is a time chart for explaining the read-ahead operation performed by the MPU 10 in the optical disk drive 1 when the read-ahead operation for reading ahead data from the optical disk 16 proceeds without encountering any errors. After the optical disk 16 has been inserted in the optical disk drive 1, when reading data from the optical disk 16 a read command for data A is issued from the host computer 3 (designated as HOST in the diagram) and input to the optical disk drive 1 via the SCSI 2. Then, under the control of the MPU 10 in the optical disk drive 1, the data A is read from the optical disk 16 (designated as DISK in the diagram), and the readout data A is stored in the data buffer 11 (designated as BUFFER in the diagram). The data A, after being temporarily stored in the data buffer 11, is transferred under the control of the MPU 10 to the host computer 3 via the SCSI 2.

When the data A is read from the optical disk 16 in response to the read command received from the host computer 3, the MPU 10 in the optical disk drive 1 performs control to read data B stored at the next address on the optical disk 16 and store the readout data B in the buffer B before the next read command is received from the host computer 3; that is, the MPU 10 performs read ahead. The MPU 10 keeps performing the read ahead by reading data C from the subsequent address on the optical disk 16, then data D from the next subsequent address, and so on, and storing the readout data sequentially in the data buffer 11.

After a certain period of time when the transfer of the data A from the optical disk drive 1 to the host computer 3 is completed, if a read request for the data B stored at the next address on the optical disk 16 arrives from the host computer 3, the MPU 10 retrieves the data B stored in the data buffer 11 and transfers it to the host computer 3 via the SCSI 2. In this way, the data B already stored in the data buffer 11 can be quickly retrieved and transferred in response to the data read request from the host computer 3. This read-ahead buffering is effective as long as the data requested by the read command from the host computer 3 coincides with the data read ahead from the optical disk 16 and stored in the data buffer 11 under the control of the MPU 10.

Figure 3A:
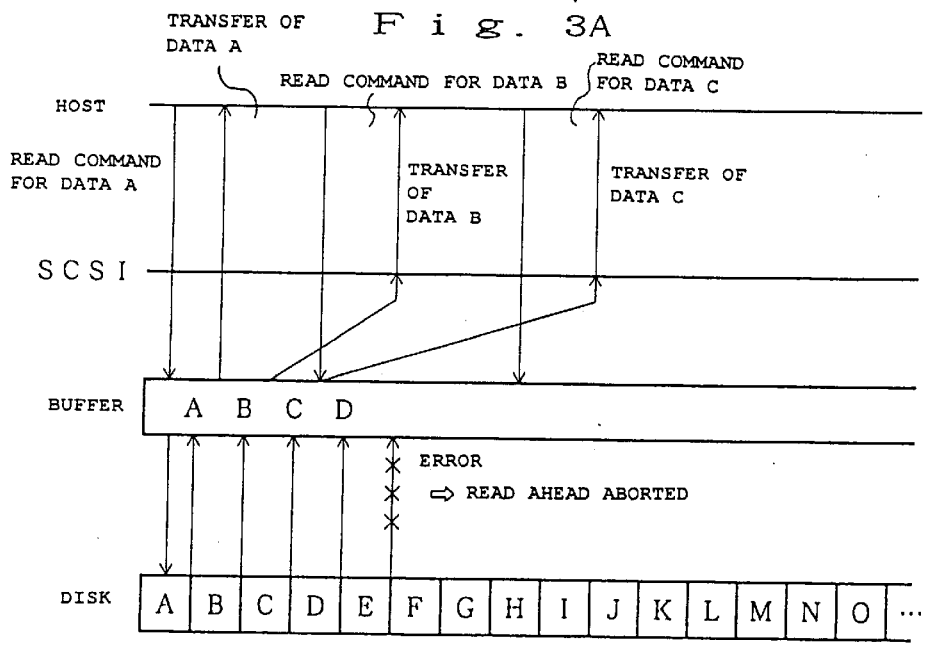
FIG. 3A is a time chart for explaining a read-ahead operation in a prior art disk drive when an error occurs during the read-ahead operation.

FIG. 3A is a time chart for explaining the read-ahead operation performed by an MPU 10 in a prior art optical disk drive when an error occurs during the read-ahead operation. In this case also, data is read from the optical disk 16 after the optical disk 16 is inserted in the optical disk drive 1. When a read command for data A is issued from the host computer 3 and input to the optical disk drive 1 via the SCSI 2, then, under the control of the MPU 10 in the optical disk drive 1, the data A is read from the optical disk 16 and the readout data A is stored in the data buffer 11. The data A, after being temporarily stored in the data buffer 11, is transferred under the control of the MPU 10 to the host computer 3 via the SCSI 2.

When the data A is read from the optical disk 16 in response to the read command received from the host computer 3, the MPU 10 in the optical disk drive 1 performs control to read data B stored at the next address on the optical disk 16 and store the readout data B in the data buffer 11 before the next read command is received from the host computer 3; that is, the MPU 10 performs read ahead. The MPU 10 keeps performing the read ahead by reading data C from the subsequent address on the optical disk 16, then data D from the next subsequent address, and so on, and storing the readout data sequentially in the data buffer 11.

However, in the prior art read-ahead scheme, if a read error occurs, for example, when reading ahead data E from the optical disk 16, the read-ahead operation is aborted at that instant in time without retrying the read operation. As a result, only the data B, data C, and data D are stored in the data buffer 11. In this case, when the read requests for the data B, data C, and data D at the subsequent addresses on the optical disk 16 thereafter arrive from the host computer 3, these requests can be serviced, but when the read command for the data E arrives, the command cannot be handled, leading to an unexpected situation where the operation of the host computer 3 stops because the requested data is not available.

Figure 3B:
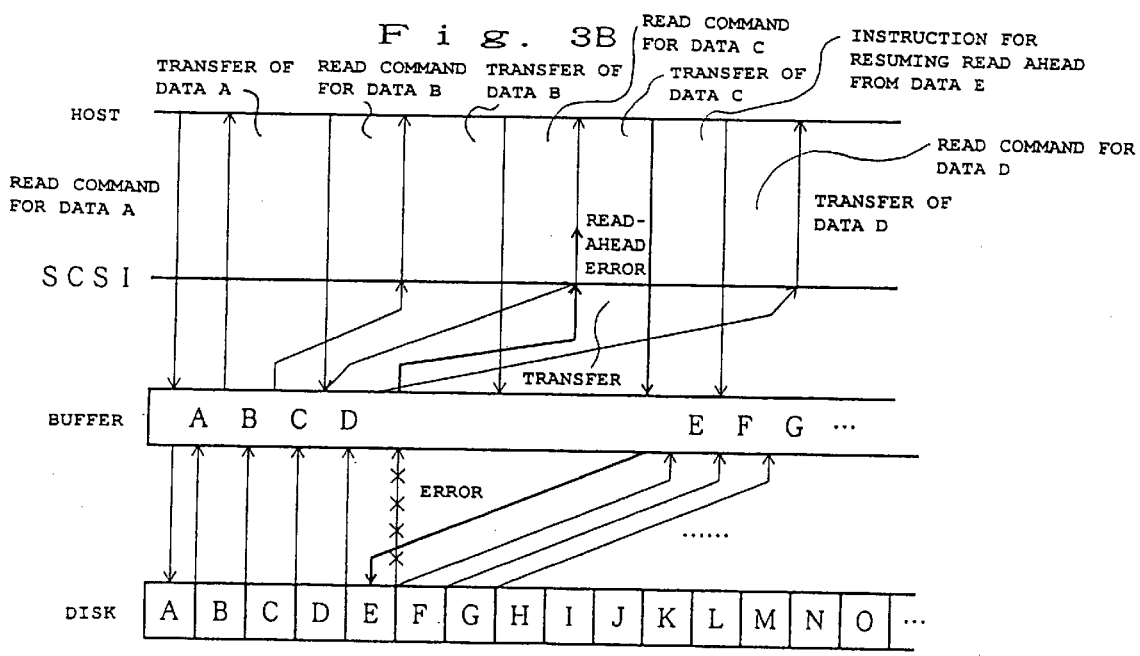
FIG. 3B is a time chart for explaining a read-ahead operation in the disk drive of the present invention when an error occurs during the read-ahead operation.

FIG. 3B is a time chart for explaining the basic read-ahead operation performed by the MPU 10 in the optical disk drive 1 of the present invention when an error occurs during the read-ahead operation. In this case also, data is read from the optical disk 16 after the optical disk 16 is inserted in the optical disk drive 1. When a read command for data A is issued from the host computer 3 and input to the optical disk drive 1 via the SCSI 2 then, under the control of the MPU 10 in the optical disk drive 1, the data A is read from the optical disk 16 and the readout data A is stored in the data buffer 11. The data A, after being temporarily stored in the data buffer 11, is transferred under the control of the MPU 10 to the host computer 3 via the SCSI 2.

When the data A is read from the optical disk 16 in response to the read command received from the host computer 3, the MPU 10 in the optical disk drive 1 performs control to read data B stored at the next address on the optical disk 16 and store the readout data B in the data buffer 11 before the next read command is received from the host computer 3; that is, the MPU 10 performs read ahead. The MPU 10 keeps performing the read ahead by reading data C from the subsequent address on the optical disk 16, then data D from the next subsequent address, and so on, and storing the readout data sequentially in the data buffer 11. The control up to this point is the same as that in the prior art.

In the prior art read-ahead scheme, however, if a read error occurs, for example, when reading ahead data E from the optical disk 16, the read-ahead operation is aborted at that instant in time without retrying the read operation. In contrast, in the present invention, when an error occurs during the read-ahead of the data E, the occurrence of the error is detected, and when a read command for the data C is thereafter received from the host computer 3, notification that an error has occurred during the read-ahead of the data E is transferred to the host computer 3 together with the data C retrieved from the data buffer 11.

Then, the host computer 3 issues an instruction instructing the optical disk drive 1 to resume the read-ahead operation from the data E, upon which the read-ahead operation is resumed from the data E on the optical disk 16. In the resumed read-ahead operation, the data E, data F, and data G are sequentially read ahead and stored in the data buffer 11, provided that an error does not occur during the read-ahead operation. Accordingly, after the read-ahead operation resume instruction issued from the host computer 3 is input into the optical disk drive 1, when the read requests for the data D and subsequent data at the subsequent addresses on the optical disk 16 arrive from the host computer 3, the optical disk drive 1 of the present invention can service the read requests without delay. The present invention thus reduces the chance of incurring an unexpected condition that causes the operation of the host computer 3 to stop.

The basic processing procedure for the read-ahead operation performed by the MPU 10 in the optical disk drive 1 of the present invention has been explained with reference to FIG. 3B. In the following, embodiments of the processing procedure performed at the host computer side and embodiments of the processing procedure performed by the MPU 10 at the optical disk drive side will be described in detail with reference to flowcharts.

Figure 4:
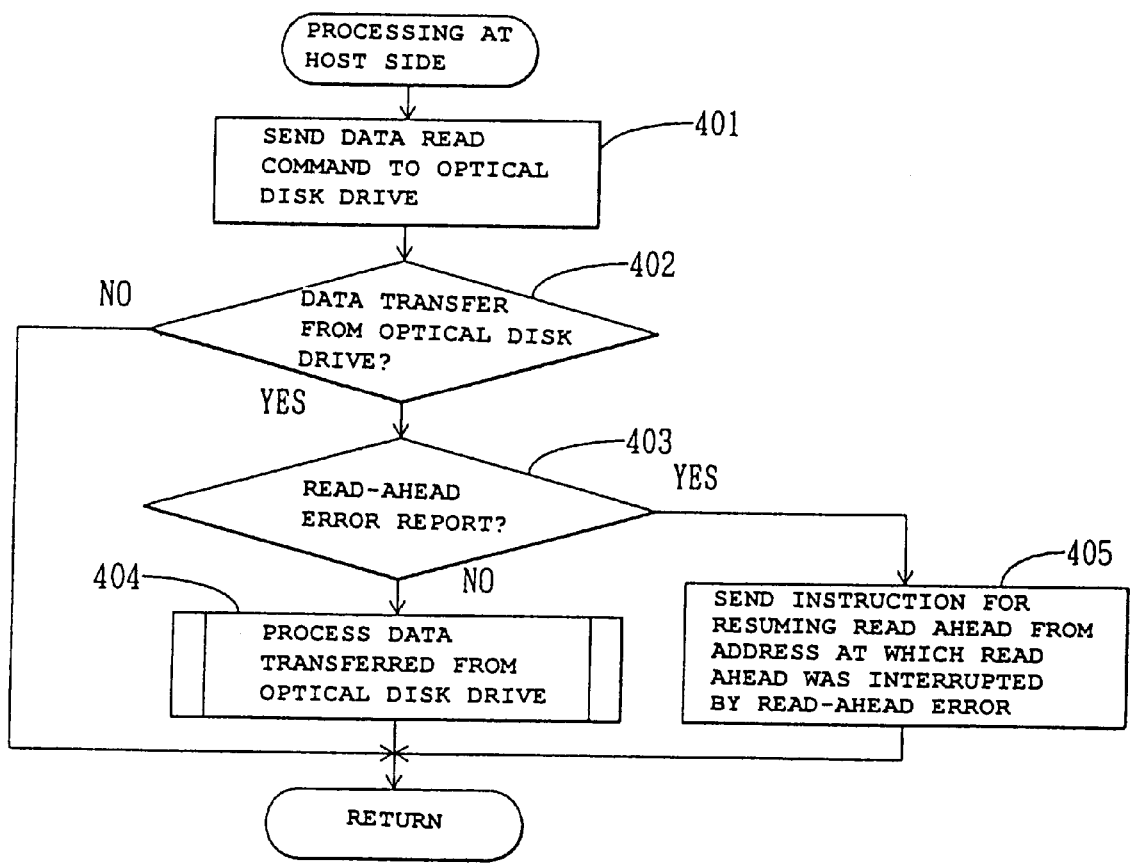
FIG. 4 is a flowchart showing one example of the processing procedure performed at the host computer side according to the present invention when an error occurs during read ahead.

FIG. 4 is a flowchart showing one example of the processing procedure performed at the host computer 3 according to the present invention when an error occurs during the read-ahead operation.

In step 401, the host computer 3 issues a data read command to the optical disk drive 1. In the next step 402, it is determined whether any data has been transferred from the optical disk drive 1; if there was no data transfer, the routine is terminated, but if there was a data transfer, the process proceeds to step 403. In step 403, it is determined whether the data transferred from the optical disk drive 1 carries a read-ahead error report.

If the data transferred from the optical disk drive 1 does not carry a read-ahead error report, the process proceeds to step 404 to process the data transferred from the optical disk drive 1, after which the routine is terminated. On the other hand, if the data transferred from the optical disk drive 1 carries a read-ahead error report, the process proceeds to step 405 to issue an instruction to the optical disk drive 1 to resume the read-ahead operation from the address at which the read-ahead operation was suspended due to the read-ahead error, after which the routine is terminated.

In this way, in the present invention, if a read error occurs during read ahead in the optical disk drive 1, the host computer 3 has the optical disk drive 1 retry the read ahead by instructing it to resume the data read ahead from the address at which the read error occurred; this serves to increase the chance of preventing the read ahead from being aborted at the optical disk drive 1, thus preventing the overall system performance from dropping.

Figure 5:
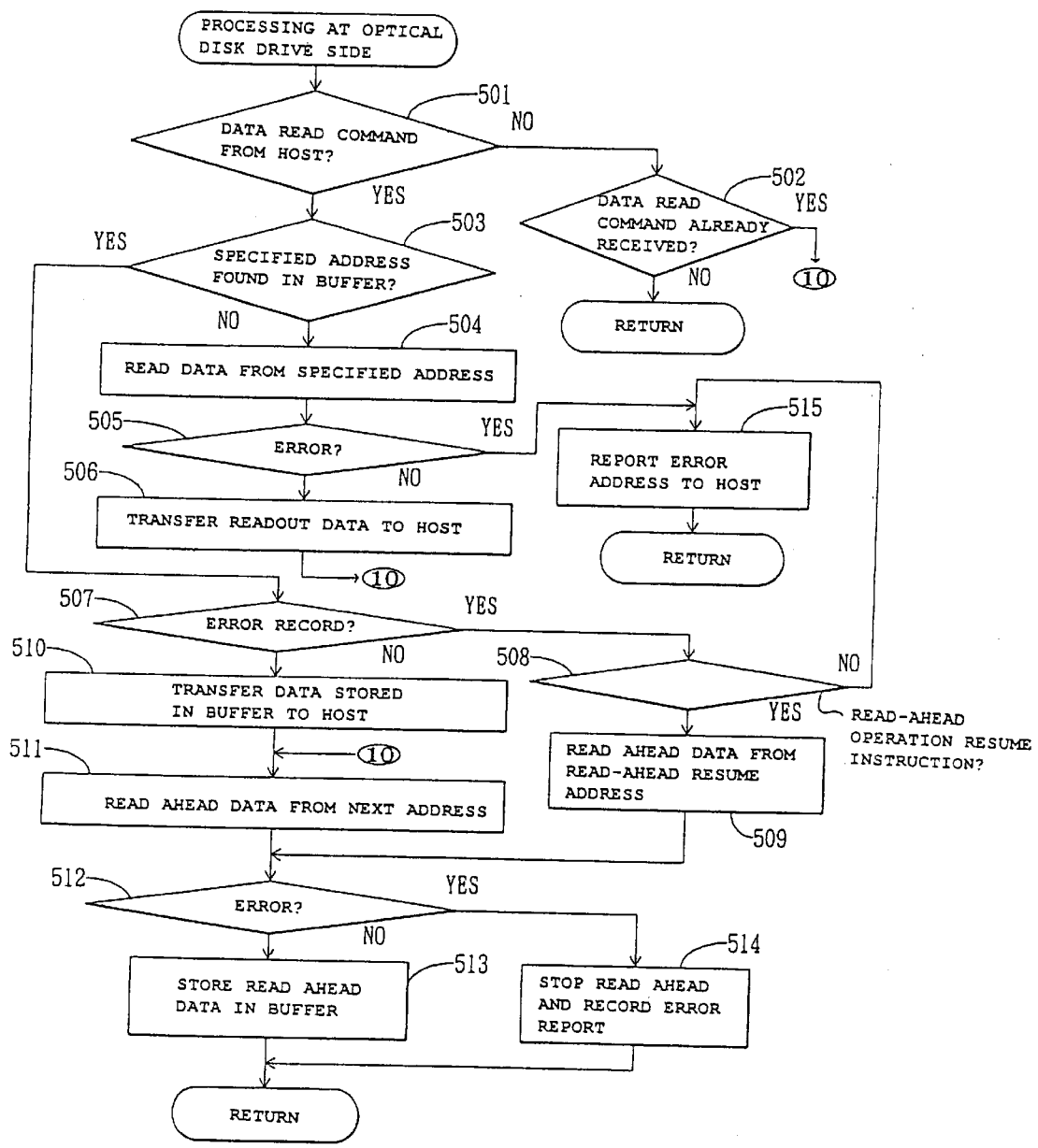
FIG. 5 is a flowchart showing a first embodiment of the processing procedure performed at the disk drive side according to the present invention when an error occurs during read ahead.

FIG. 5 is a flowchart illustrating a first embodiment of the processing procedure performed by the MPU 10 in the disk drive 1 according to the present invention when an error occurs during read ahead. The processing procedure of FIG. 5 is performed at predetermined intervals of time. Hereinafter, the read-ahead operation is simply referred to as read ahead.

First, the procedure when there is no error in the read ahead will be described. In this case, it is determined in step 501 whether a data read command is received from the host computer 3; if there is no data read command, the process proceeds to step 502, but if there is a data read command, the process proceeds to step 503. In step 502, it is determined whether there is a data read command already received from the host computer 3; if there is no such data read command, the routine is terminated. The processing performed when it is determined in step 502 that there is an already received data read command will be described later. On the other hand, in step 503, which is carried out when a data read command is received from the host computer 3, it is determined whether the read address specified by the host computer 3 is in the data buffer 11. If the specified read address is not in the data buffer 11, for example, if the read command from the host computer 3 is a first read command received from it, the process proceeds to step 504 and the requested data is read from the specified address on the optical disk 16.

In the next step 505, it is determined whether an error has occurred during the reading of the data from the specified address. If there is no error, the process proceeds to step 506, and the readout data is transferred to the host computer 3. In the next step 511, data at the address immediately following the specified read address is read ahead. Here again, it is determined in step 512 whether an error has occurred during the read ahead; if there is no error, the process proceeds to step 513, and the read ahead data is stored in the data buffer 11, after which the routine is terminated.

When the routine is initiated starting from step 501 after the predetermined time, if there is no new read command received from the host computer 3, the process proceeds to step 502. In this case, since there is a read command already received from the host computer 3, the answer to the decision in step 502 is YES, and the process proceeds to step 511 to repeat the read ahead from step 511 to step 513 described above, after which the routine is terminated.

On the other hand, when the routine is initiated starting from step 501 after the predetermined time, if there is a new read command received from the host computer 3, the process proceeds to step 503; at this time, if the read address specified by the command from the host computer 3 is in the data buffer 11, the process jumps from step 503 to step 507. In step 507, it is determined whether there is an error record; if there is no error record, the process proceeds to step 510. In step 510, the data stored in the data buffer 11 is transferred to the host computer 3. After that, the data read ahead from step 511 to step 513 described above is repeated, and the routine is terminated.

The control procedure when there is no error during data reading from the optical disk 16 has been described above. Next, the control procedure when an error occurs during data reading from the optical disk 16 will be described below. There are two cases for error occurrences, (1) the case in which an error occurs during reading from the address specified by the first read command, and (2) the case in which an error occurs during read ahead. The description will be given for each case.

(1) The case in which an error occurs during reading from the address specified by the first read command.

This is the case where an error occurs when reading data from the specified address during the process from step 501 to step 504. In this case, it is determined in step 505 that an error has occurred, and the process proceeds to step 515. In step 515, the address at which the error has occurred is reported to the host computer 3, and the routine is terminated.

In this case, the host computer 3 reissues the read command for the same address, so that the process from step 501 to 504 is repeated.

(2) The case in which an error occurs during read ahead.

This is the case where an error occurs when reading ahead the data at the subsequent address in step 511 after completing the process from step 501 to step 510. In this case, it is determined in step 512 that an error has occurred, and the process proceeds to step 514. In step 514, the read ahead is suspended, and an error report is stored in the data buffer 11. In this case, when the process proceeds to step 507 after completing the steps 501 and 503 a prescribed time later, it is determined that there is an error record, and the process proceeds to step 508.

In step 508, it is determined whether a read-ahead operation resume instruction has been received or not but, at the time immediately after the occurrence of the read ahead error, since the error report is not yet sent out to the host computer 3, the host computer 3 does not know of the occurrence of the error; as a result, the host computer 3 has not yet issued a read-ahead resume instruction. Accordingly, the process proceeds to step 515 to notify the host computer 3 of the address at which the error has occurred, after which the routine is terminated. Once the error address has been reported to the host computer in step 515, the host computer 3 issues the read-ahead operation resume instruction as explained in connection with step 405 in FIG. 4. As a result, when the process proceeds to step 508 next time, it is determined that a read-ahead operation resume instruction has been received, and the process proceeds to step 509. In step 509, data is read ahead from the read-ahead resume address.

After resuming the read ahead in step 509, the process from step 512 to step 514 is performed; that is, data is sequentially stored, in the data buffer 11, while it is checked for the occurrence of an error during the read ahead.

In this way, in the present invention, when a read error occurs during the read ahead in the optical disk drive 1, the host computer 3 instructs the optical disk drive 1 to resume the data read ahead from the address at which the read error occurred and retry the read ahead; this serves to increase the chance of preventing the read ahead from being aborted at the optical disk drive 1, thus preventing the overall system performance from dropping.

Figure 6:
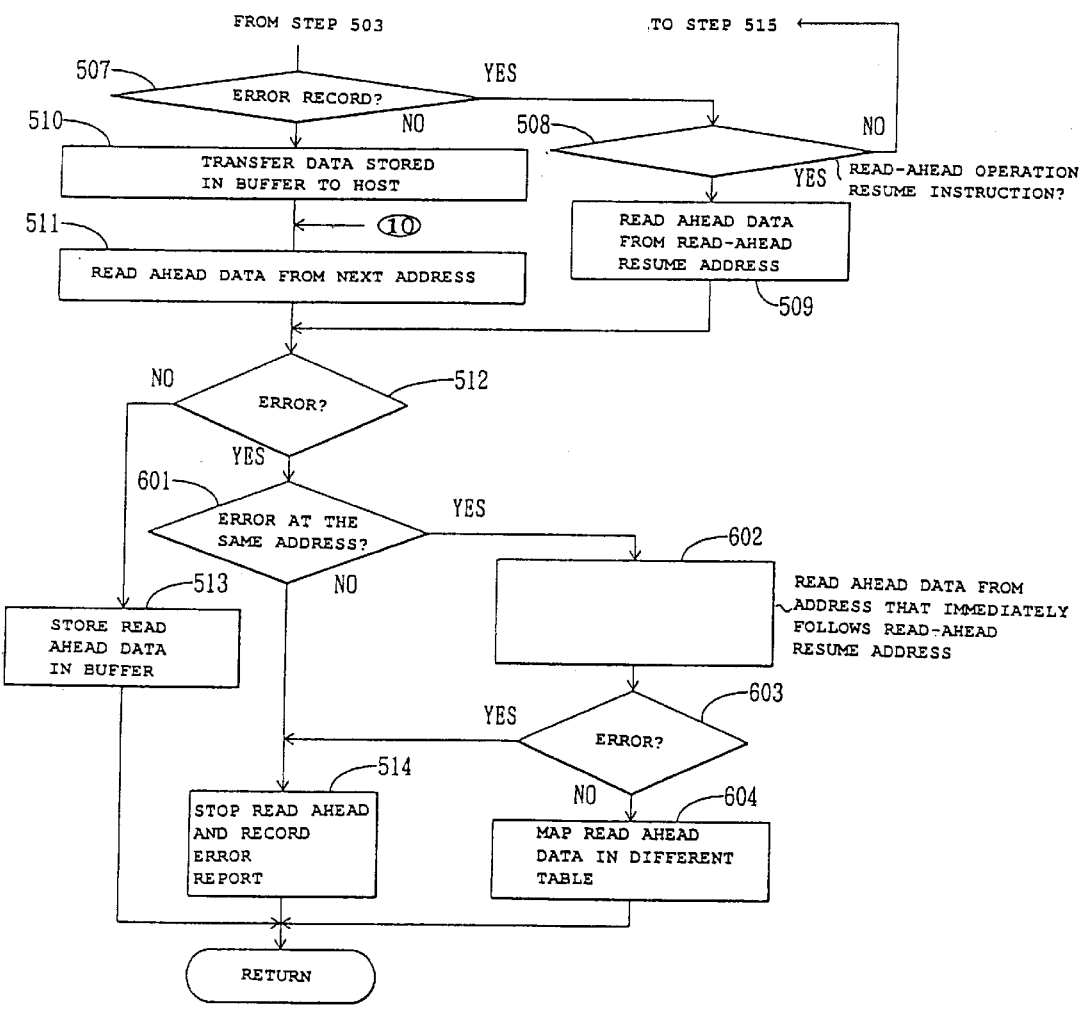
FIG. 6 is a flowchart showing a second embodiment of the processing procedure performed at the disk drive side according to the present invention when an error occurs during read ahead.

FIG. 6 is a flowchart illustrating a second embodiment of the processing procedure performed at the disk drive 1 according to the present invention when an error occurs during read ahead. Accordingly, FIG. 6 shows the processing procedure staring from step 507 in FIG. 5, and the same processing steps as those in FIG. 5 are labeled with the same step numbers.

In the first embodiment described with reference to FIG. 5, when an error occurs during read ahead, and a read-ahead operation resume instruction is received from the host computer 3, data is read ahead in step 509 from the read-ahead resume address, and in the next step 512, it is determined whether an error has occurred during the read ahead; if it is determined in step 512 that an error has occurred, the process proceeds to step 514, only to stop the read ahead. In contrast, in the second embodiment shown in FIG. 6, after the read ahead is resumed in accordance with the read-ahead operation resume instruction from the computer 3, if it is determined in step 512 that an error has occurred during the read ahead, step 601 is performed before proceeding to step 514. This is where the second embodiment differs from the first embodiment. In step 601, when it is determined in step 512 that an error has occurred again after resuming the read ahead, then it is determined whether the error has occurred at the same address as the address at which the previous error occurred.

In the second embodiment, if it is determined in step 601 that the error has occurred at a different address, the processing of step 514 is carried out as in the first embodiment, but if it is determined that the error has occurred at the same address, the process from step 602 to step 604 is carried out. In step 602, when the read error has occurred again at the same address, the read ahead is performed by skipping that address. More specifically, in step 602, data is read ahead from the address that immediately follows the read-ahead resume address specified by the host computer 3.

In the next step 603, it is determined whether an error has occurred during the read ahead from the address that immediately follows the read-ahead resume address. If a read error has occurred here during the read ahead, the process proceeds to step 514 where the read ahead is stopped and an error report is recorded. On the other hand, if there are no errors during the read ahead from the address that immediately follows the read-ahead resume address, the process proceeds to step 604 where the read ahead data is mapped not in the same table as the previous data, but in a different table, after which the routine is terminated.

In this way, in the second embodiment, when a read error occurs at the same address for the second time in succession, the data read from that address is skipped, and data at the address immediately following the error address is read ahead, thus preventing the read ahead from being stopped needlessly.

Figure 7:
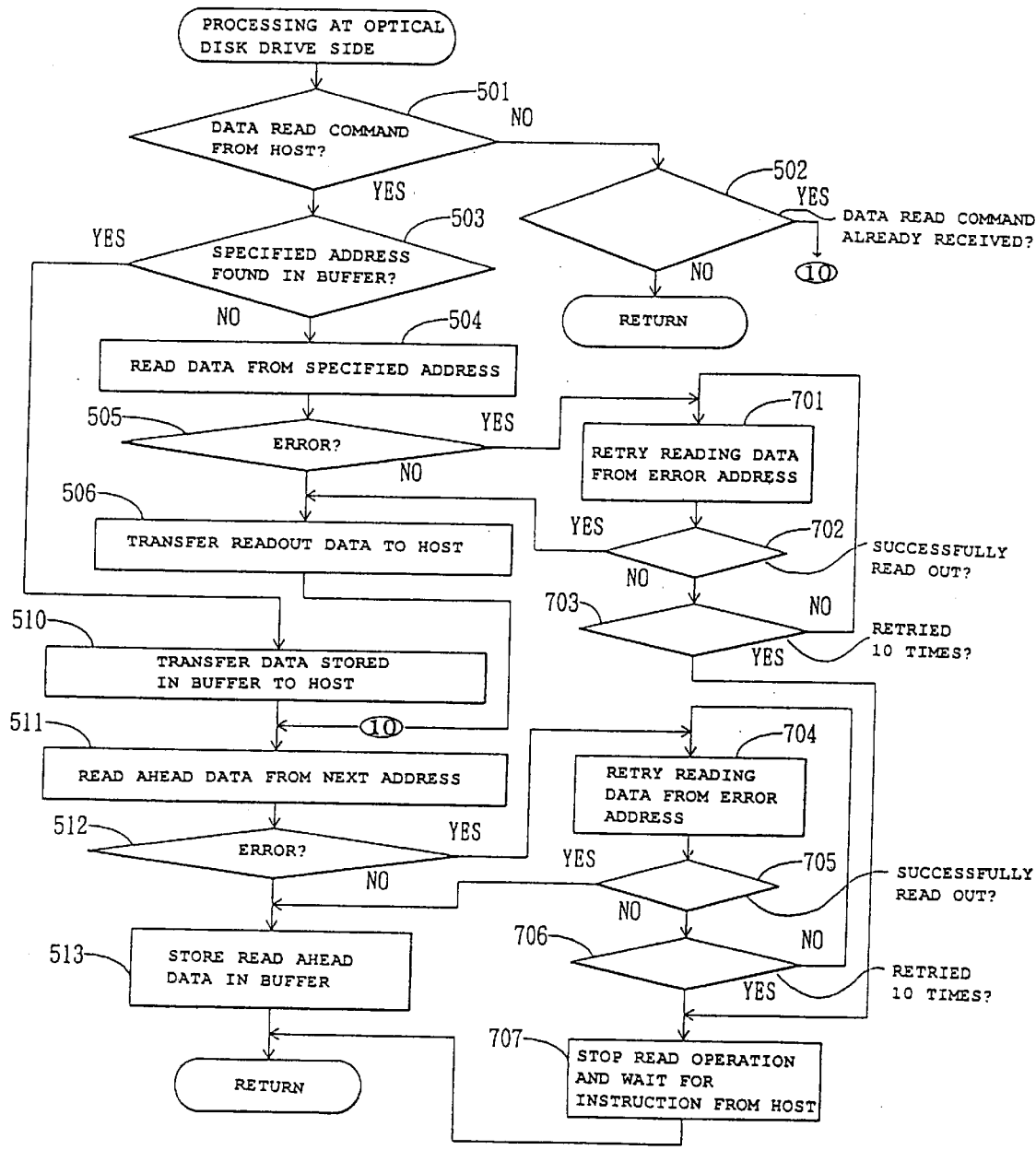
FIG. 7 is a flowchart showing a third embodiment of the processing procedure performed at the disk drive side according to the present invention when an error occurs during read ahead.

FIG. 7 is a flowchart illustrating a third embodiment of the processing procedure performed at the disk drive 1 according to the present invention when an error occurs during read ahead. The processing procedure performed at the disk drive 1 when there is no error in the read ahead is the same as that of the first or second embodiment. Therefore, the same processing steps as those in FIGS. 5 and 6 are labeled with the same step numbers.

In the first and second embodiments shown in FIGS. 5 and 6, each time an error occurs during the data read from the address specified by the host computer 3 or during the read ahead, the error is reported to the host computer 3. In contrast, in the third embodiment, when an error occurs, during the data read from the address specified by the host computer 3 or during the read ahead, the optical disk drive 1 autonomously retries the data read from the address at which the error occurred. This is where the third embodiment differs from the first and second embodiments.

In the third embodiment also, the processing procedure will be described for two cases, i.e., (1) the case in which an error occurs during reading from the address specified by the first read command, and (2) the case in which an error occurs during read ahead.

(1) The case in which an error occurs during reading from the address specified by the first read command.

This is the case where an error occurs when reading data from the specified address during the process from step 501 to step 504. In this case, it is determined in step 505 that an error has occurred, and the process proceeds to step 701. In step 701, a retry operation is performed to retry reading data from the address at which the error has occurred. In the next step 702, it is determined whether the data has been read out successfully by the retry operation; if the data has been read out successfully, the process returns to step 506 to continue the normal operation.

On the other hand, if the retry operation in step 701 failed to read data from the error address on the optical disk 16, the process proceeds from step 702 to step 703. In step 703, it is determined whether the number of retries successively made to read data from the error address has reached a predetermined number of times, for example, 10. If it is determined in step 703 that the number of retries is less than 10, the process returns to step 701 to repeat the retry operation; on the other hand, if it is determined that the number of retries has reached 10, the process proceeds to step 707. In step 707, the read operation is stopped and an error report is sent to the host computer 3 to wait for an instruction from the host computer 3, and in this condition, the routine is terminated.

(2) The case in which an error occurs during read ahead.

This is the case where an error occurs when reading ahead the data at the subsequent address in step 511 after completing the process from step 501 to step 510. In this case, it is determined in step 512 that an error has occurred, and the process proceeds to step 704. In step 704, a retry operation is performed to retry reading data from the address at which the error has occurred. In the next step 705, it is determined whether the data has been read out successfully by the retry operation; if the data has been read out successfully, the process returns to step 513 to continue the normal operation.

On the other hand, if the retry operation failed in step 704 to read data from the error address on the optical disk 16, the process proceeds from step 705 to step 706. In step 706, it is determined whether the number of retries successively made to read data from the error address has reached a predetermined number of times, for example, 10. If it is determined in step 706 that the number of retries is less than 10, the process returns to step 704 to repeat the retry operation; on the other hand, if it is determined that the number of retries has reached 10, the process proceeds to step 707. In step 707, the read operation is stopped and an error report is sent to the host computer 3 to wait for an instruction from the host computer 3, and in this condition, the routine is terminated.

In this way, in the third embodiment, when an error occurs during read ahead in the optical disk drive 1, retries are made in the optical disk drive 1 up to the predetermined number of times to read data from the read error address before reporting the read error to the host computer 3; this increases the chance of being able to recover from the read error without the need to wait for a retry instruction from the host computer 3, and the overall system performance can thus be enhanced.

Figure 8:
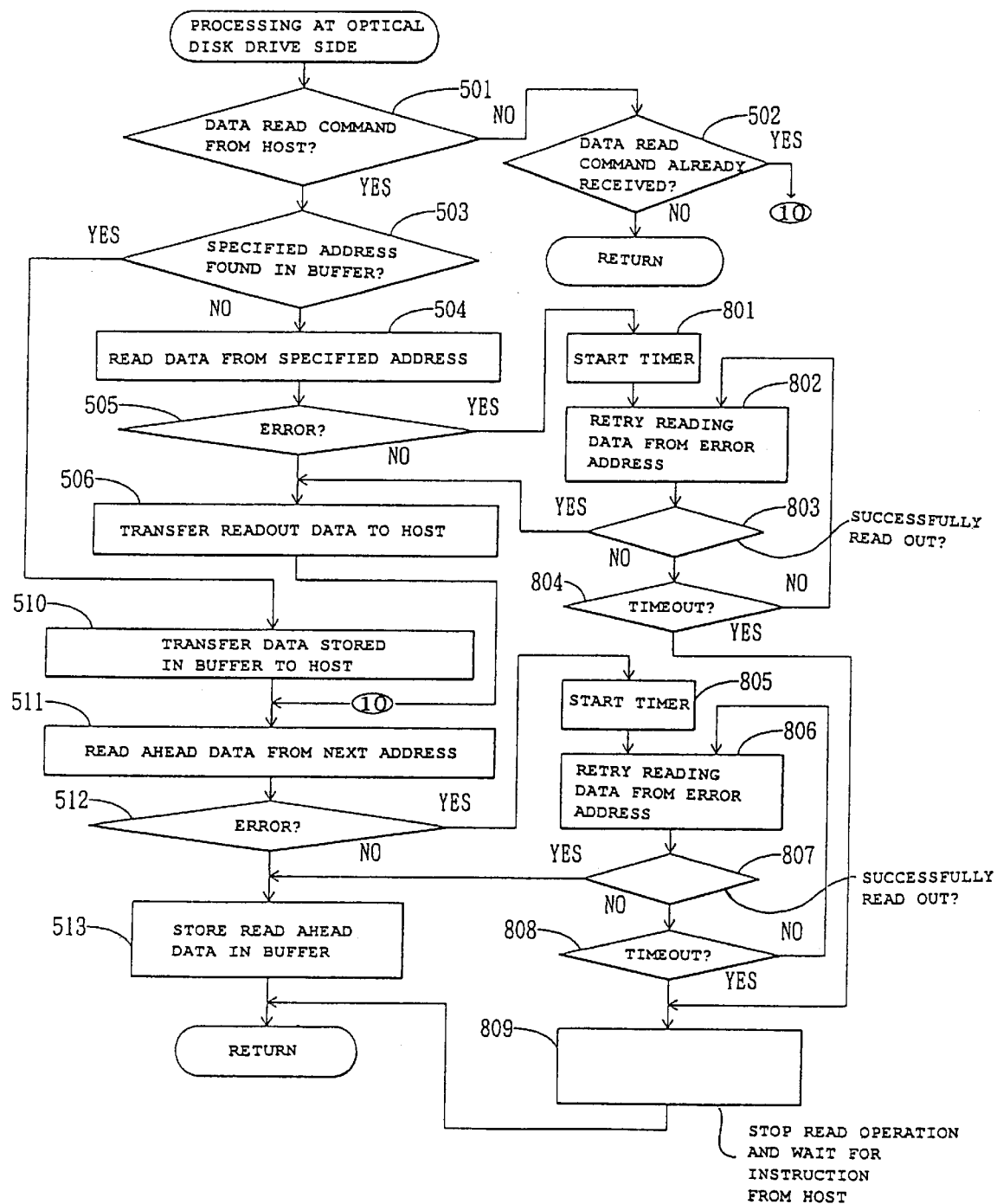
FIG. 8 is a flowchart showing a fourth embodiment of the processing procedure performed at the disk drive side according to the present invention when an error occurs during read ahead.

FIG. 8 is a flowchart illustrating a fourth embodiment of the processing procedure performed at the disk drive 1 according to the present invention when an error occurs during read ahead. In the fourth embodiment, as in the third embodiment, when an error has occurred during data reading from the address specified by the host computer 3 or during the read ahead, the optical disk drive 1 autonomously retries the data read from the address at which the error occurred. The only difference between the fourth embodiment and the third embodiment is that while the retry operation is limited in the third embodiment in terms of the number of retries, in the fourth embodiment the retry operation is limited in terms of time. Accordingly, in the fourth embodiment, the same processing steps as those in the foregoing embodiments are labeled with the same step numbers.

In the fourth embodiment also, the processing procedure will be described for two cases, i.e., (1) the case in which an error occurs during reading from the address specified by the first read command, and (2) the case in which an error occurs during read ahead.

(1) The case in which an error occurs during reading from the address specified by the first read command.

This is the case where an error occurs when reading data from the specified address during the process from step 501 to step 504. In this case, it is determined in step 505 that an error has occurred, and the process proceeds to step 801. In step 801, a timer for counting an elapsed time is started, after which the process proceeds to step 802. In step 802, a retry operation is performed to retry reading data from the address at which the error has occurred. In the next step 803, it is determined whether the data has been read out successfully by the retry operation; if the data has been read out successfully, the process returns to step 506 to continue the normal operation.

On the other hand, if the retry operation in step 802 failed to read data from the error address on the optical disk 16, the process proceeds from step 803 to step 804. In step 804, whether the retry operation performed to read data from the error address has exceeded a predetermined time is determined by referring to the timer counting started in step 801. If the retry time in step 804 is within the predetermined time, the process returns to step 802 to repeat the retry operation; on the other hand, if it is determined that the retry time has exceeded the predetermined time, the process proceeds to step 809. In step 809, the read operation is stopped and an error report is sent to the host computer 3 to wait for an instruction from the host computer 3 and, in this condition, the routine is terminated.

(2) The case in which an error occurs during read ahead.

This is the case where an error occurs when reading ahead the data at the subsequent address in step 511 after completing the process from step 501 to step 510. In this case, it is determined in step 512 that an error has occurred, and the process proceeds to step 805. In step 805, a timer for counting elapsed time is started, after which the process proceeds to step 806. In step 806, a retry operation is performed to retry reading data from the address at which the error has occurred. In the next step 807, it is determined whether the data has been read out successfully by the retry operation; if the data has been read out successfully, the process returns to step 513 to continue the normal operation.

On the other hand, if the retry operation in step 806 failed to read data from the error address on the optical disk 16, the process proceeds from step 807 to step 808. In step 808, whether the retry operation performed to read data from the error address has exceeded a predetermined time is determined by referring to the timer counting started in step 805. If the retry time in step 808 is within the predetermined time, the process returns to step 806 to repeat the retry operation; on the other hand, if it is determined that the retry time has exceeded the predetermined time, the process proceeds to step 809. In step 809, the read operation is stopped and an error report is sent to the host computer 3 to wait for an instruction from the host computer 3, and in this condition, the routine is terminated.

In this way, in the fourth embodiment, when an error occurs during read ahead in the optical disk drive 1, retries are made in the optical disk drive 1 for the predetermined period of time to read data from the read error address before reporting the read error to the host computer 3; this increases the chance of being able to recover from the read error without the need to wait for a retry instruction from the host computer 3, and the overall system performance can thus be enhanced.

In the third embodiment, when it is determined that the retry has been made 10 times, and in the fourth embodiment, when the time that the retry has been made exceeds the predetermined time, the read operation is stopped and an error report is sent to the host computer 3 to wait for an instruction from the host computer 3, and in this condition, the routine is terminated. As an alternative embodiment, the third or fourth embodiment may be combined with the second embodiment in such a manner that in the third embodiment, when it is determined that the retry has been made 10 times, or in the fourth embodiment, when the time that the retry has been made exceeds the predetermined time, the process from step 602 to step 604 in the second embodiment is performed, that is, the read ahead is resumed from the address that immediately follows the error address, and the readout data from the next and subsequent addresses are mapped in a separate new table.

One example of the processing procedure performed at the host computer 3 and the first to fourth embodiments of the processing procedure performed at the disk drive 1 when a read ahead error occurs in the optical disk drive 1 of the invention have been described above. Next, a description will be given of embodiments dealing with various cases occurring during the read-ahead operation of the present invention, such as when a data write command arrives from the host computer 3 while read ahead is being performed in the optical disk drive 1 of the invention.

Figure 9:
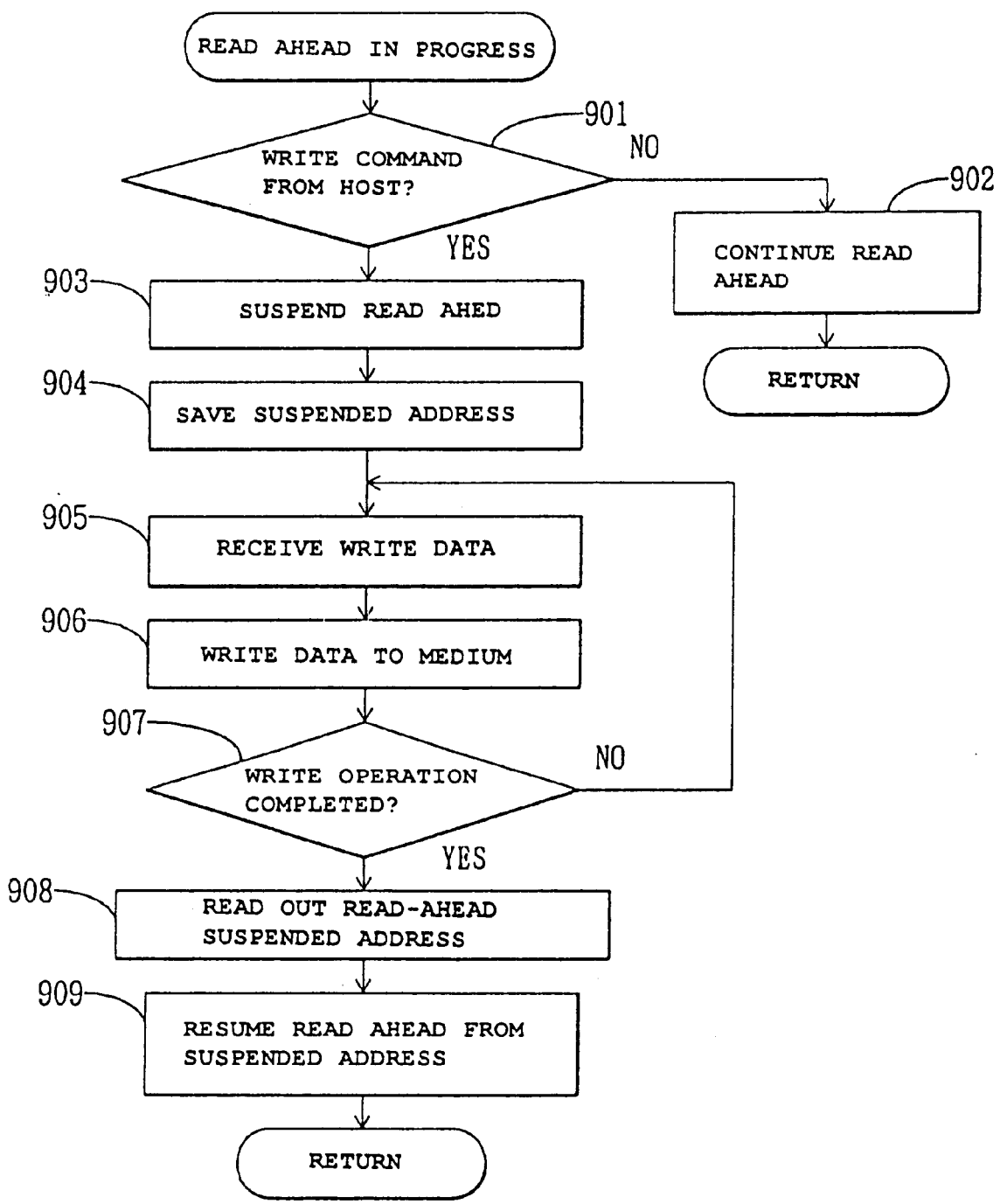
FIG. 9 is a flowchart showing a first embodiment of a read-ahead processing procedure according to the present invention.

FIG. 9 is a flowchart showing a first embodiment of the read-ahead procedure for the case where a data write command arrives from the host computer 3 when the optical disk drive 1 of the present invention is performing read ahead. This routine is executed at predetermined intervals of time.

First, in step 901, it is determined whether a data write command has arrived from the host computer 3 during read ahead. When there is no such write command, the process proceeds to step 902 to continue the read-ahead operation, and the routine is terminated. On the other hand, when a data write command has arrived from the host computer 3 during read ahead, the process proceeds from step 901 to step 903 where the read ahead is suspended. In the next step 904, the address at which the read ahead was suspended is saved and, in step 905, the write data transferred from the host computer 3 is received and stored in the data buffer 11.

In the next step 906, the write data stored in the data buffer 11 is written to the optical disk (medium) 16. Then, in step 907, it is determined whether the write operation is completed or not; if the write operation is not completed yet, the process returns to step 905 to repeat the process of receiving the write data and writing it to the optical disk 16. On the other hand, if it is determined in step 907 that the write operation is completed, the process proceeds to step 908 where the read-ahead suspended address saved in step 904 is read out. Then, in the next step 909, the read ahead is resumed from the suspended address, and the routine is terminated.

Figure 10:
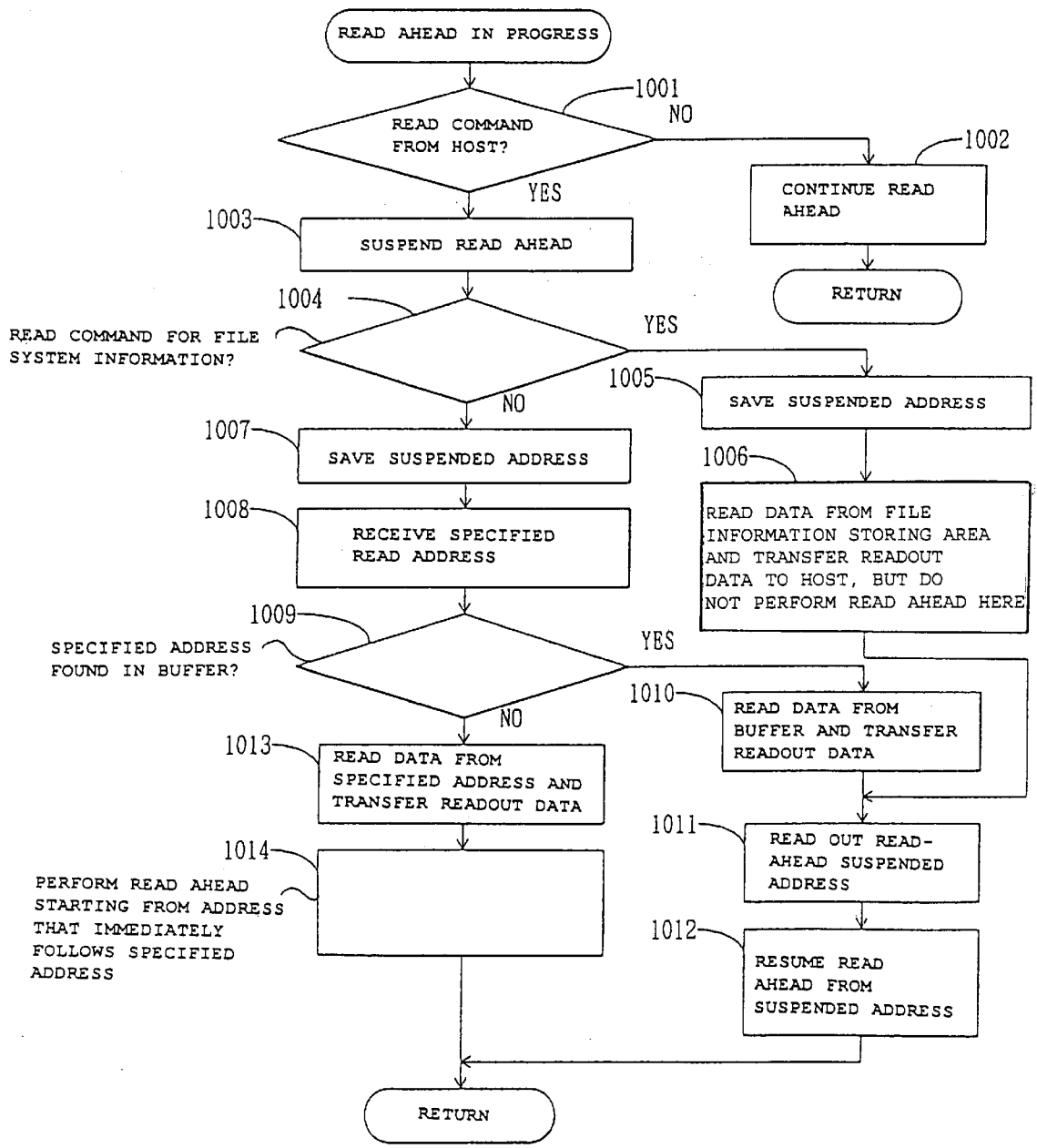
FIG. 10 is a flowchart showing a second embodiment of a read-ahead processing procedure according to the present invention.

FIG. 10 is a flowchart showing a second embodiment of the read-ahead procedure of the present invention. In the second embodiment, if a data read command for a specific predetermined address arrives from the host computer 3 during the read-ahead operation of the optical disk drive 1, the optical disk drive 1 temporarily suspends the read-ahead operation; in this case, however, read ahead for that specific address is not performed, but the read-ahead operation is resumed from the address at which the operation was suspended.

First, in step 1001, it is determined whether a data read command has arrived from the host computer 3 during read ahead. If there is no such read command, the process proceeds to step 1002 to continue the read-ahead operation, and the routine is terminated. On the other hand, if a data read command has arrived from the host computer 3 during read ahead, the process proceeds from step 1001 to step 1003 to suspend the read-ahead operation. Then, in the next step 1004, it is determined whether the read command is one for reading file system information.

If the read command from the host computer 3 is one for reading file system information, then in step 1005 the address at which the read ahead was suspended is saved, after which the process proceeds to step 1006 where data is read out from the specified address in the file information storing area and transferred to the host computer 3. In this case, read ahead is not done for the next address in the file information storing area. Then, in step 1011, the read-ahead suspended address saved in step 1003 is read out. In the next step 1012, the read-ahead operation is resumed from the suspended address, and the routine is terminated.

On the other hand, if the read command from the host computer 3 is not one for reading file system information, then in step 1007 the address at which the read ahead was suspended is saved, after which the process proceeds to step 1008 to receive the address specified by the read command. Then, in step 1009, it is determined whether the address specified by the read command received from the host computer 3 is in the data buffer 11.

If the address specified by the read command received from the host computer 3 is in the data buffer 11, the process proceeds to step 1010 where data is read from the specified address in the data buffer 11 and transferred to the host computer 3. Then, in step 1011, the read-ahead suspended address saved in step 1007 is read out. In the next step 1012, the read-ahead operation is resumed from the suspended address, and the routine is terminated. On the other hand, if the address specified by the read command received from the host computer 3 is not found in the data buffer 11, the process proceeds to step 1013 where data is read from the specified address on the optical disk 16 and transferred to the host computer 3. Then, in step 1014, read ahead is performed starting from the address that immediately follows the specified address on the optical disk 16, and the routine is terminated.

In this way, in the second embodiment of read ahead, when a data read command for a specific predetermined address such as one for file system information is received from the host computer 3, the optical disk drive 1 temporarily suspends the read-ahead operation and, in this case, read ahead for that specific address is not performed, but the read-ahead operation is resumed from the address at which the operation was suspended.

Figure 11:
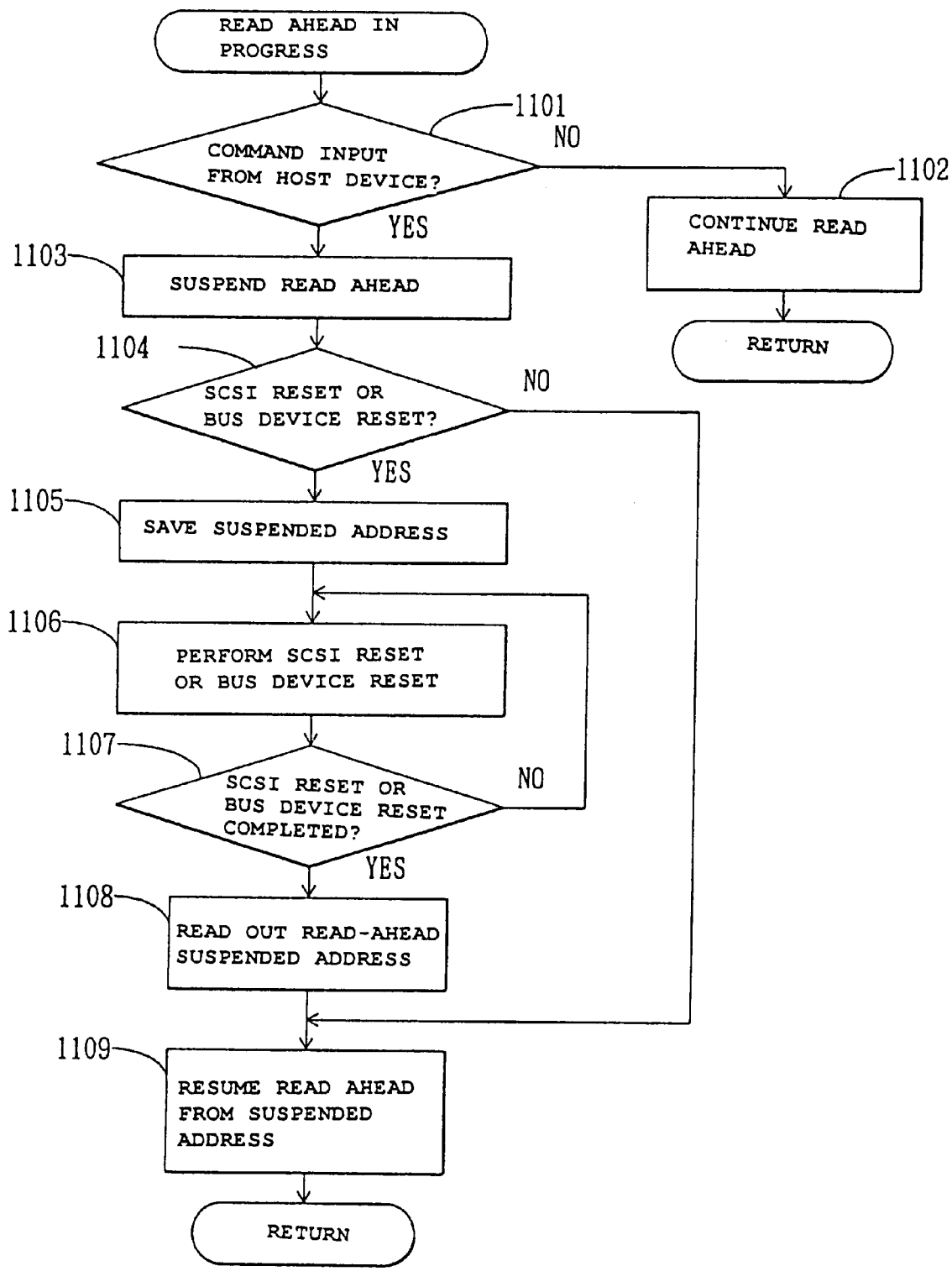
FIG. 11 is a flowchart showing a third embodiment of a read-ahead processing procedure according to the present invention.

FIG. 11 is a flowchart showing a third embodiment of the read-ahead procedure of the present invention. In the third embodiment, if a particular reset command arrives from the host computer 3 during the read-ahead operation of the optical disk drive 1, the optical disk drive 1 temporarily suspends the read-ahead operation and, after the reset specified by the reset command is completed, the read-ahead operation is resumed from the suspended address.

First, in step 1101, it is determined whether there is a command input from the host computer 3 during read ahead. If there is no command input, the process proceeds to 1102 to continue the read-ahead operation, and the routine is terminated. On the other hand, if there is a command input from the host computer 3 during read ahead, the process proceeds from step 1101 to step 1103 to suspend the read-ahead operation. Then, in the next step 1104, it is determined whether the command is a SCSI reset command or a bus device reset command.

If the command input from the host computer 3 is neither a SCSI reset command nor a bus device reset command, the process proceeds from step 1104 to step 1109 to resume the read-ahead operation from the address at which it was suspended, and the routine is terminated.

On the other hand, if the command input from the host computer 3 is either a SCSI reset command or a bus device reset command, the suspended address is saved in step 1105, after which the process proceeds to step 1106. In step 1106, SCSI resetting or bus device resetting, whichever is specified by the reset command, is performed. In step 1107, it is determined whether the SCSI resetting or the bus device resetting is completed or not; if it is not completed yet, the process returns to step 1106 to perform the SCSI resetting or the bus device resetting. If it is determined in step 1107 that the SCSI resetting or the bus device resetting is completed, the process proceeds to step 1108 to read the read-ahead suspended address saved in step 1105. Then, in the next step 1109, the read-ahead operation is resumed from the suspended address, and the routine is terminated.

In this way, in the third embodiment of read ahead, when a predesignated reset command, such as a SCSI reset command or a bus device reset command, is received from the host computer 3 during the read-ahead operation of the disk drive 1, the read-ahead operation of the optical disk drive 1 is suspended, the reset operation specified by the reset command is preferentially performed and, after the reset operation is completed, the read-ahead operation is resumed from the address at which it was suspended.

Figure 12:
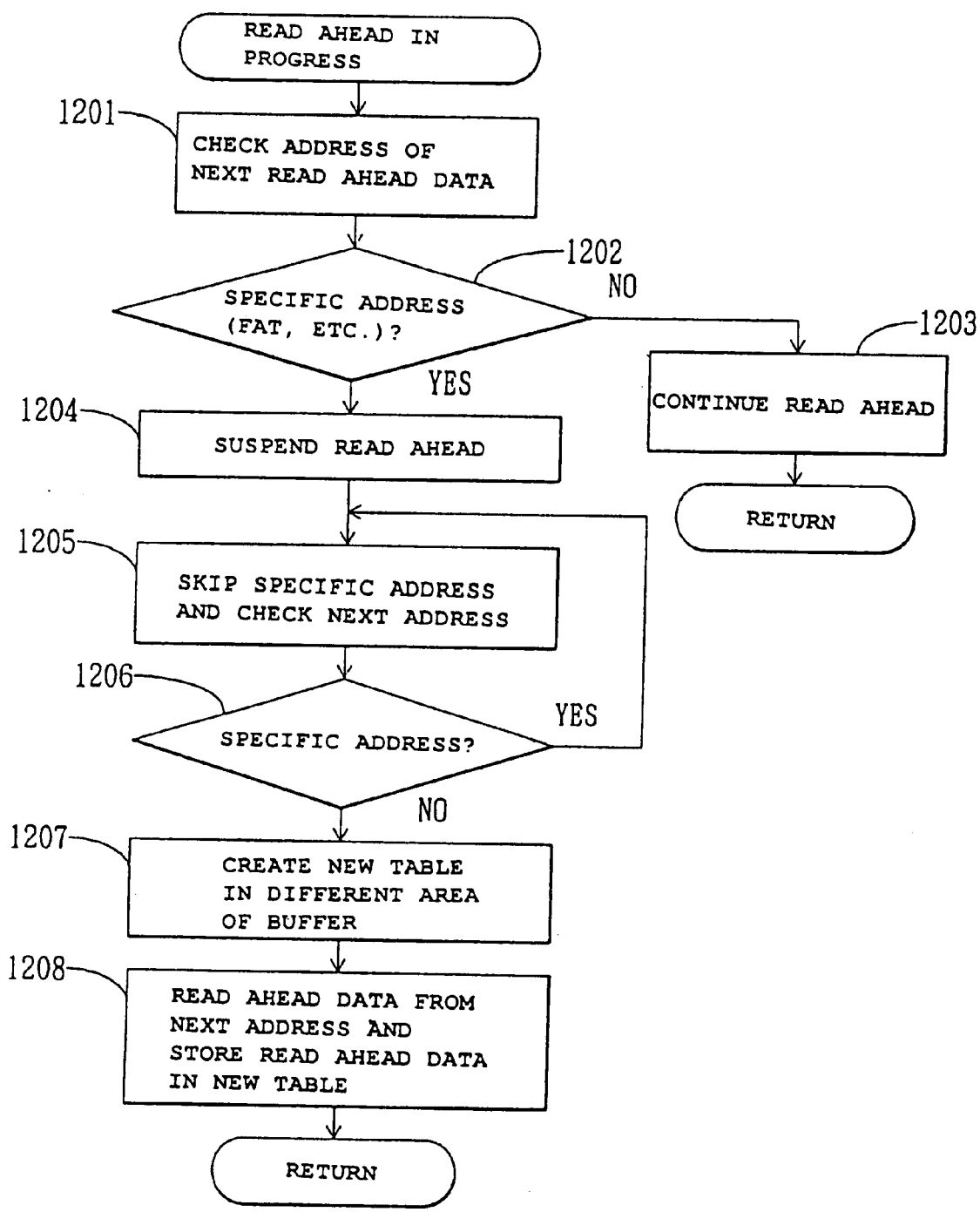
FIG. 12 is a flowchart showing a fourth embodiment of a read-ahead processing procedure according to the present invention.

FIG. 12 is a flowchart showing a fourth embodiment of the read-ahead procedure of the present invention. In the fourth embodiment, if a specific predetermined address is reached during the read-ahead operation of the optical disk drive 1, the optical disk drive 1 temporarily suspends the read-ahead operation, skips that specific address, and resumes the read-ahead operation from the next address, while at the same time, changing the table in which the read ahead data is mapped.

First, in step 1201, the address of the next read ahead data is checked during read ahead. Next, in step 1202, it is determined whether the thus checked address of the next read ahead data coincides with a specific address, for example, an address of the FAT. If the address of the next read ahead data is not such a specific address, the process proceeds to step 1203 to continue the read-ahead operation, and the routine is terminated.

On the other hand, if the address of the next read ahead data coincides with a specific address, the process proceeds from step 1202 to step 1204 where the read-ahead operation is suspended. In the next step 1205, data at this specific address is not read ahead, but this address is skipped, and the address of the next read ahead data is checked. In step 1206, it is determined whether the thus checked address of the next read ahead data coincides with a specific address, for example, an address of the FAT; if the address of the next read ahead data coincides with a specific address, the process returns to step 1205. On the other hand, if the address of the next read ahead data is not such a specific address, the process proceeds to step 1207, and a new table is created in a different storing area of the data buffer 11. In the next step 1208, data is read ahead from the next address, the read ahead data is stored in the new table created in step 1207, and the routine is terminated.

In this way, in the fourth embodiment of read ahead, if a specific predetermined address, such as the FAT, is reached during the read-ahead operation of the optical disk drive 1, the optical disk drive 1 temporarily suspends the read-ahead operation, skips that specific address, and resumes the read-ahead operation from the next address, while at the same time; once the read-operation is suspended, the table in which the read ahead data is mapped is changed.

The first to fourth embodiments dealing with various cases occurring during the read-ahead operation of the present invention have been described above. Next, a description will be given of the read-ahead operation that the MPU 10 performs when the optical disk 16 is loaded into the optical disk drive 1 of the present invention.

Figure 13:
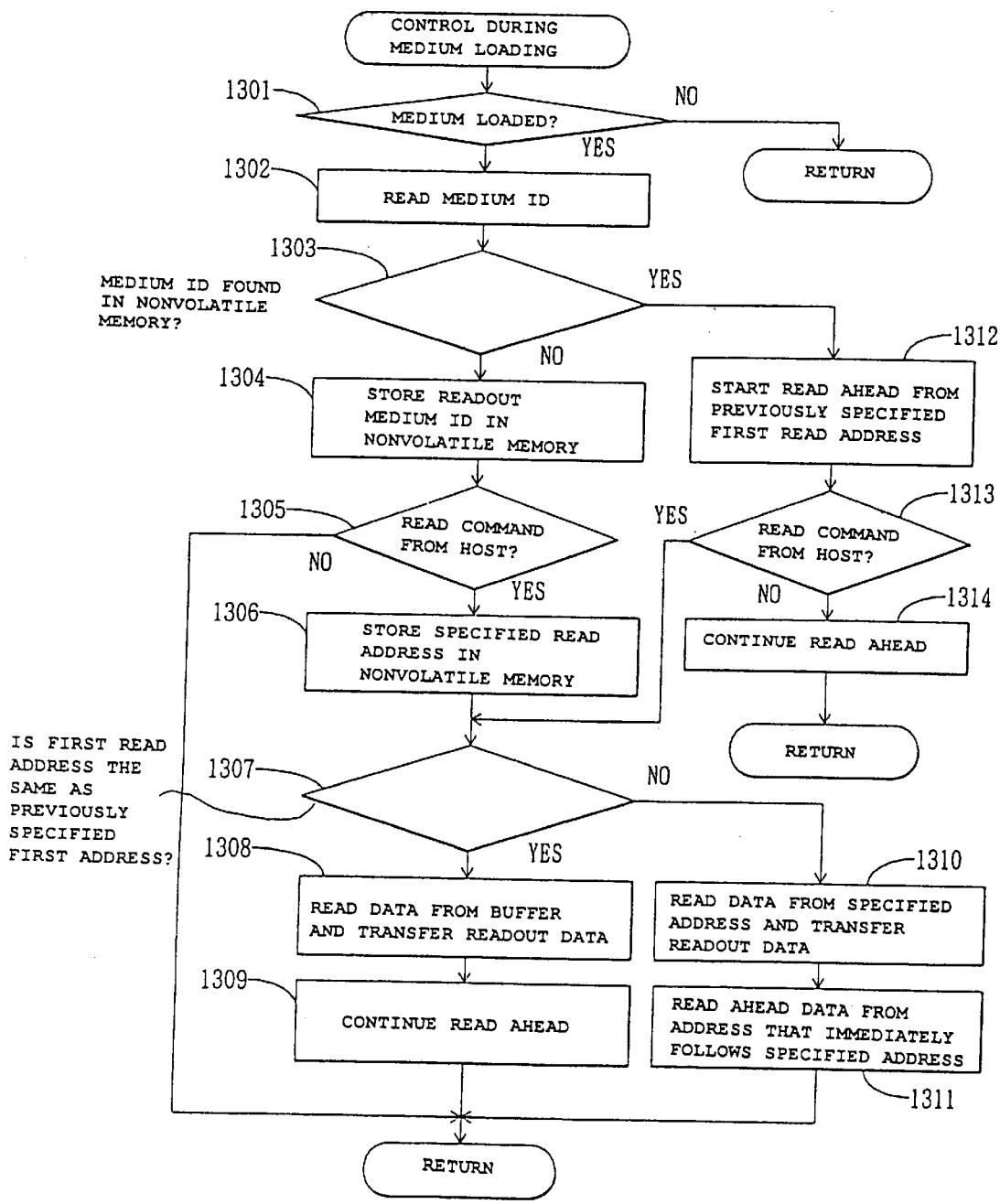
FIG. 13 is a flowchart showing a first embodiment of the processing procedure performed when a medium is loaded into the disk drive of the present invention.

FIG. 13 is a flowchart showing a first embodiment of the processing procedure performed when the optical disk 16 is loaded into the optical disk drive 1 of the present invention. The routine of FIG. 13 is executed at predetermined intervals of time.

In step 1301, it is determined whether the optical disk (medium) 16 is loaded into the optical disk drive 1. If it is not loaded, the routine is terminated immediately; on the other hand, if it is loaded, the process proceeds to step 1302. In step 1302, the medium ID is read from the loaded optical disk 16. In the next step 1303, a search is conducted to see whether the readout medium ID matches one stored in the nonvolatile memory 18 in the optical disk drive 1. First, a description will be given of the processing performed when the medium ID read from the optical disk 16 is not found in the nonvolatile memory 18 in the optical disk drive 1.

When the medium ID read from the optical disk 16 is not found in the nonvolatile memory 18 in the optical disk drive 1, the process proceeds to step 1304 to store the medium ID in the nonvolatile memory 18, after which the process proceeds to step 1305. In step 1305, it is determined whether there is a read command from the host computer 3; if there is no read command from the host computer 3, the routine is terminated immediately. On the other hand, if there is a read command from the host computer 3, the process proceeds to step 1306 where the address specified by the read command is stored in the nonvolatile memory 18 in association with the medium ID.

In the next step 1307, it is determined whether the first read address specified by the host computer 3 is the same as the previously specified first address. Since the process has proceeded to step 1307 after determining in step 1303 that the medium ID was not found in the nonvolatile memory 18, the first read address specified by the host computer 3 is not the same as the previously specified first address. Therefore, in this case, the process proceeds to step 1310 where the data at the address specified by the host computer 3 is read from the optical disk 16 and transferred to the host computer 3. In the next step 1311, data is read ahead from the address that immediately follows the address currently specified by the host computer 3, and the routine is terminated.

On the other hand, if the medium ID is found in the nonvolatile memory in step 1303, the process proceeds to step 1312. In step 1312, read ahead is started from the first read address previously specified by the host computer 3, irrespective of the presence or the absence of a read command currently received from the host computer 3. Then, in the next step 1313, it is determined whether there is a read command from the host computer 3; if there is no read command, the process proceeds to step 1314 to continue the read-ahead operation. On the other hand, if it is determined in step 1313 that there is a read command from the host computer 3, the process proceeds to step 1307.

In step 1307, it is determined whether the first read address specified by the host computer 3 is the same as the previously specified first address. If the currently specified first read address is not the same as the previously specified first address, the process proceeds to step 1310 where the data at the address specified by the host computer 3 is read from the optical disk 16 and transferred to the host computer 3. In the next step 1311, data is read ahead from the address that immediately follows the address currently specified by the host computer 3, and the routine is terminated.

On the other hand, if it is determined in step 1307 that the currently specified first read address is the same as the previously specified first address, the process proceeds to step 1308. When it is determined that the currently specified first read address is the same as the previously specified first address, the data at the previously specified first address is already read ahead and stored in the data buffer 11 in step 1312. Accordingly, in step 1308, the data corresponding to the currently specified first read address is read from the data buffer 11 and transferred to the host computer 3. After that, the process proceeds to step 1309 to continue the read ahead started in step 1312, and the routine is terminated.

In this way, in the first embodiment of the processing procedure performed when the optical disk 16 is loaded into the optical disk drive 1, upon loading the optical disk 16 into the optical disk drive 1 the nonvolatile memory 18 is searched for the medium ID number of the optical disk 16 and its associated first read address and, if these are found, read ahead is performed starting from the previously specified first read address. As a result, when the currently specified first read address matches the previously specified first read address, the response of the optical disk drive 1 to the host computer 3 becomes faster.

Figure 14:
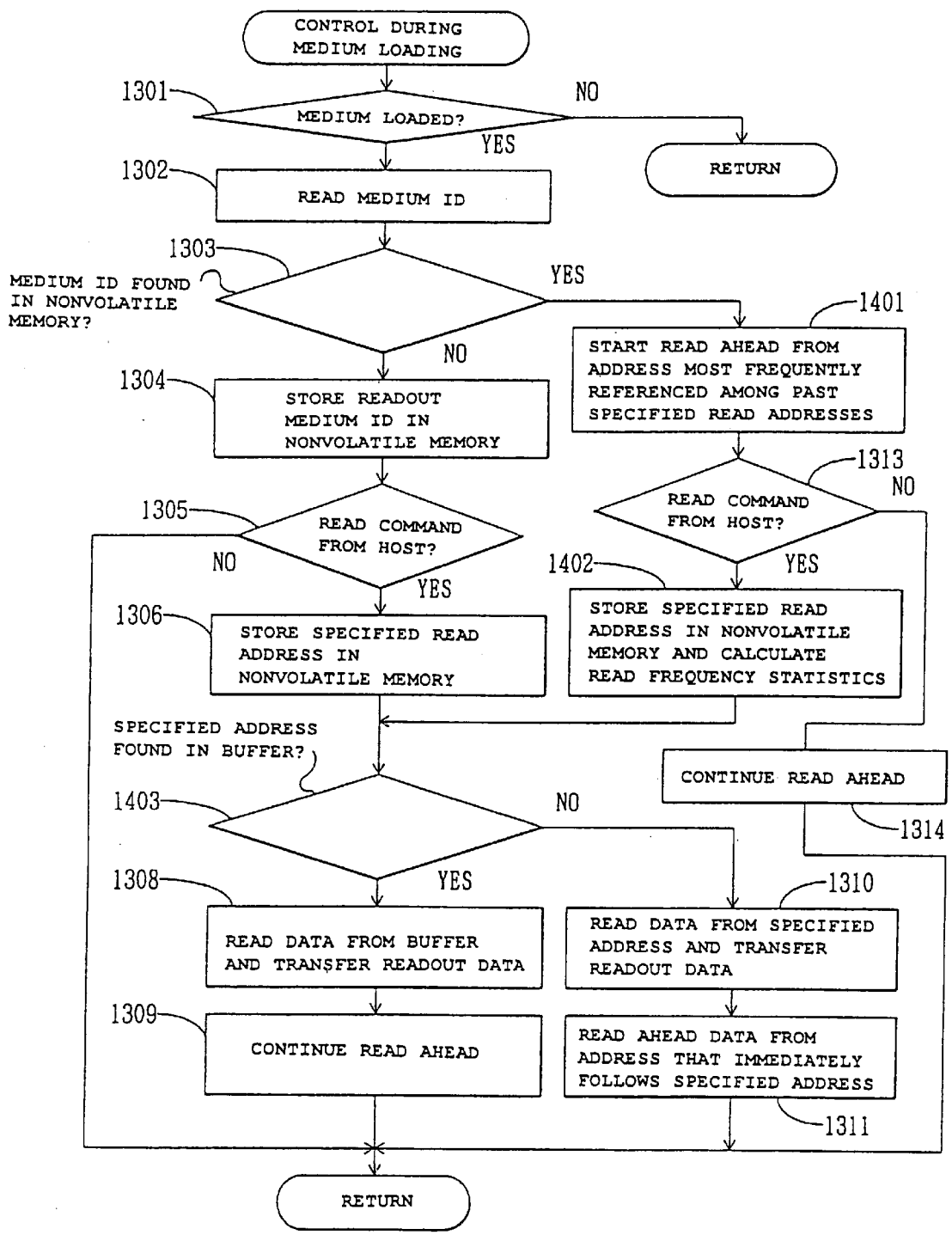
FIG. 14 is a flowchart showing a second embodiment of the processing procedure performed when a medium is loaded into the disk drive of the present invention.

FIG. 14 is a flowchart showing a second embodiment of the processing procedure performed when the optical disk 16 is loaded into the optical disk drive 1 of the present invention. The routine of FIG. 14 is also executed at predetermined times.

As described above, in the first embodiment of the processing procedure performed when the optical disk 16 is loaded into the optical disk drive 1, upon loading the optical disk 16 into the optical disk drive 1 the nonvolatile memory 18 is searched for the medium ID number of the optical disk 16 and its associated first read address and, if these are found, read ahead is performed from the previously specified first read address. On the other hand, in the second embodiment, when the medium ID of the loaded optical disk 16 is found in the nonvolatile memory 18, read ahead is performed starting from the address most frequently referenced in the past among the past specified read addresses. This is the only difference from the first embodiment. Accordingly, the same steps as those in the first embodiment are labeled with the same step numbers, and will not be described in detail herein.

First, a description will be given of the processing performed when the medium ID read from the optical disk 16 is not found in the nonvolatile memory 18 in the optical disk drive 1. In this case, the processing is substantially the same as that in the first embodiment. That is, in step 1301 it is determined whether the optical disk (medium) 16 is loaded into the optical disk drive 1, in step 1302 the medium ID is read from the loaded optical disk 16, and in step 1303 it is determined that the readout medium ID is not found in the nonvolatile memory 18 in the optical disk drive 1, so that in step 1304 the readout medium ID is stored in the nonvolatile memory 18. Then, if it is determined in step 1305 that there is no read command from the host computer 3, the routine is immediately terminated; on the other hand, if it is determined that there is a read command, the process proceeds to step 1403.

In the second embodiment, it is determined in step 1403 whether the specified address matches one stored in the data buffer 11. When the medium ID read from the optical disk 16 is not found in the nonvolatile memory 18 in the optical disk drive 1, since read ahead is not performed, the answer to the query is NO; therefore, as in the first embodiment, in step 1310 the data at the address specified by the host computer 3 is read from the optical disk 16 and transferred to the host computer 3, and in step 1311 data is read ahead from the address that immediately follows the address currently specified by the host computer 3, after which the routine is terminated.

Next, a description will be given of the processing performed when the medium ID read from the optical disk 16 is found in the nonvolatile memory 18 in the optical disk drive 1. In this case, the answer to the query in step 1303 is YES, so that the process proceeds to step 1401. In step 1401, read ahead is started from the address most frequently referenced in the past among the past specified first addresses on the optical disk 16 having the above medium ID. This is where the second embodiment differs from the first embodiment. The processing in the next step 1313 is the same at that in the first embodiment; that is, it is determined whether there is a read command from the host computer 3, and if there is no read command, the process proceeds to step 1314 to continue the read-ahead operation, after which the routine is terminated.

On the other hand, if it is determined in step 1313 that there is a read command from the host computer 3, the process proceeds to step 1402. In step 1402, the first read address specified by the host computer 3 is stored in the nonvolatile memory 18, and read frequency statistics for the first specified read address within the same medium ID are calculated, after which the process proceeds to step 1403. The processing in step 1402 constitutes the feature of the second embodiment which is not found in the first embodiment.

In step 1403, it is determined whether the read address specified by the host computer 3 is found in the data buffer 11. If the read address specified by the host computer 3 is found in the data buffer 11, the process proceeds to step 1308 where the data corresponding to the specified read address is read from the data buffer 11 and transferred to the host computer 3. After that, the process proceeds to step 1309 to continue the read ahead started in step 1312, and the routine is terminated. On the other hand, if the read address specified by the host computer 3 is not found in the data buffer 11, the process proceeds to step 1310 where the data at the address specified by the host computer 3 is read from the optical disk 16 and transferred to the host computer 3. In the next step 1311, data is read ahead from the address that immediately follows the address currently specified by the host computer 3, and the routine is terminated.

In this way, in the second embodiment of the processing procedure performed when the optical disk 16 is loaded into the optical disk drive 1, upon loading the optical disk 16 into the optical disk drive 1, the nonvolatile memory 18 is searched for the medium ID number of the optical disk 16 and its associated first read address and, if these are found, read ahead is performed starting from the address most frequently referenced in the past among the first read addresses whose read frequencies have been computed so far. As a result, the probability of the first read address matching one stored in the data buffer 11 for a particular medium ID increases, and the response of the optical disk drive 1 to the host computer 3 becomes faster.

Although the above embodiments have been described by taking a magneto-optical disk drive as an example of the disk drive, the disk drive of the present invention is not specifically limited to the magneto-optical disk drive, but the invention can be applied effectively to CD and other optical disk drives.

Potential for Exploitation in Industry

According to the configuration of the optical disk drive of the invention that performs data read ahead as described above, when the host computer has a read-ahead operation resume notification function, the read-ahead operation, once suspended due to the occurrence of a read error, can be resumed by reporting the error to the host computer and utilizing the read-ahead operation resume notification function of the host computer. This serves to increase the data read speed of the optical disk drive.

What is claimed is:

1. A disk drive comprising a reproducing part connected to a host device via an interface for reproducing data recorded on a disk, a buffer memory for storing said reproduced data, and a control part for causing said reproducing part to reproduce data in accordance with an address contained in a data read signal supplied from said host device, and for transferring said reproduced data to said host device after temporarily storing said reproduced data in said buffer memory, said disk drive characterized by the provision of:

a read-ahead processing part for performing a read-ahead operation by sequentially reading ahead data from addresses starting at the address that immediately follows the address contained in said data read signal supplied from said host device;

an error occurrence detecting part for detecting the occurrence of an error during said read-ahead operation;

an error occurrence reporting part for suspending, when the occurrence of an error is detected, said read-ahead operation at the address at which said error occurred, and for reporting the occurrence of said error to said host device; and a read-ahead operation resume instructing part for instructing, upon receiving a prescribed command from said host device after reporting the occurrence of said error to said host device, said read-ahead processing part to resume said read-ahead operation from the address at which said read-ahead operation was suspended.

2. A disk drive as claimed in claim 1, wherein when said error occurrence detecting part detects the occurrence of a read-ahead error at the same address for a second time, said read-ahead operation resume instructing part instructs said read-ahead processing part to resume said read-ahead operation from the address that immediately follows said error-detected address, without causing said error occurrence reporting part to suspend said read-ahead operation, and at the same time, changes the contents of said buffer memory where read ahead data is mapped.

3. A disk drive as claimed in claim 1, further including a writing part for writing data to said disk, wherein when a data write command is issued from said host device during the read-ahead operation of said read-ahead processing part, said read-ahead processing part suspends said read-ahead operation and, after data writing by said writing part is completed, resumes said read-ahead operation from the address at which said read-ahead operation was suspended.

4. A disk drive as claimed in claim 1, wherein when a data read command for a specific predetermined address is issued from said host device during the read-ahead operation of said read-ahead processing part, said read-ahead processing part temporarily suspends said read-ahead operation, but does not perform read ahead for said specific address but resumes said read-ahead operation from the address at which said read-ahead operation was suspended.

5. A disk drive as claimed in claim 1, wherein when a designated reset command is issued from said host device during the read-ahead operation of said read-ahead processing part, said read-ahead processing part suspends said read-ahead operation and, after resetting by said reset command is completed, resumes said read-ahead operation from the address at which said read-ahead operation was suspended.

6. A disk drive as claimed in claim 1, wherein when a specific predetermined address is reached during the read-ahead operation of said read-ahead processing part, said read-ahead processing part temporarily suspends said read-ahead operation, skips said specific address, and resumes said read-ahead operation from the address that immediately follows said specific address while, at the same time, changing the contents of said buffer memory where read ahead data is mapped.

7. A disk drive as claimed in claim 1, further comprising a nonvolatile internal memory, characterized by the provision of:

an ID confirming part for confirming an ID number recorded on said disk each time said disk is loaded into said disk drive;

a first read address storing part for storing a first read address in said nonvolatile memory in association with said ID number, said first read address being one received from said host device for the first time after said disk is loaded into said disk drive; and a preceding read-ahead processing part for searching said first read address storing part for the ID number of said disk and its associated first read address when said disk is loaded into said disk drive and, when said ID number and said associated first read address are found, causing said read-ahead processing part to perform a read-ahead operation starting from said first read address.

8. A disk drive as claimed in claim 1, further comprising a nonvolatile internal memory, characterized by the provision of:

an ID confirming part for confirming an ID number recorded on said disk each time said disk is loaded into said disk drive;

a first read address storing part for storing a first read address in said nonvolatile memory in association with said ID number, said first read address being one received from said host device for the first time after said disk is loaded into said disk drive;

a first read address storing frequency calculating part for calculating for each said ID number a frequency representing the number of times that said first read address is stored by said first read address storing part; and a preceding read-ahead processing part for searching said first read address storing part for the ID number of said disk and its associated first read address when said disk is loaded into said disk drive and, when said ID number and said associated first read address are found, causing said read-ahead processing part to perform a read-ahead operation starting from the first read address whose frequency calculated by said first read address storing frequency calculating part is the highest.

* * * * *